(12) United States Patent
Maruyama et al.

(10) Patent No.: US 11,992,988 B2
(45) Date of Patent: May 28, 2024

(54) INJECTION MOLDING APPARATUS

(71) Applicant: Seiko Epson Corporation, Tokyo (JP)

(72) Inventors: Hidenobu Maruyama, Azumino (JP); Kazuyuki Harayama, Matsumoto (JP); Yuta Sakai, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/750,482

(22) Filed: May 23, 2022

(65) Prior Publication Data

US 2022/0371248 A1 Nov. 24, 2022

(30) Foreign Application Priority Data

May 24, 2021 (JP) ................................. 2021-086942

(51) Int. Cl.
*B29C 45/76* (2006.01)
*B29C 45/14* (2006.01)
(Continued)

(52) U.S. Cl.
CPC .... *B29C 45/7653* (2013.01); *B29C 45/14008* (2013.01); *B29C 45/1744* (2013.01);
(Continued)

(58) Field of Classification Search
CPC ................ B29C 45/47; B29C 45/1744; B29C 45/64–45/80
See application file for complete search history.

(56) References Cited

U.S. PATENT DOCUMENTS

| | | | | |
|---|---|---|---|---|
| 2014/0341693 | A1* | 11/2014 | Van Den Brink | .... B65C 9/0006 414/801 |
| 2019/0358903 | A1* | 11/2019 | Watanabe | ............... B22F 10/22 |
| 2021/0107194 | A1* | 4/2021 | Kusakabe | .......... G05B 19/4063 |

FOREIGN PATENT DOCUMENTS

| | | | |
|---|---|---|---|
| DE | 102015207704 | * | 10/2016 |
| EP | 3520984 | A1 | 8/2019 |
| JP | 2000-202852 | A | 7/2000 |

(Continued)

OTHER PUBLICATIONS

KR20160127661 machine translation (Year: 2016).*
DE102015207704 machine translation (Year: 2016).*
Jp2000202852 machine translation (Year: 2000).*

*Primary Examiner* — Arrie L Reuther
*Assistant Examiner* — Alexander A Wang
(74) *Attorney, Agent, or Firm* — Harness, Dickey & Pierce, P.L.C.

(57) ABSTRACT

An injection molding apparatus includes a support that supports a molding die including an upper die and a lower die, and an injection unit that injects a molding material toward a cavity defined by the upper die and the lower die. In the state in which the molding die is supported by the support, the injection unit, the upper die, and the lower die are arranged sequentially from above in the vertical direction. The injection unit includes a rotating flat screw having a groove forming surface in which a groove is formed, a barrel having a flat screw facing surface facing the groove forming surface and having a communication hole into which the molding material flows, and a heater that heats a material supplied to the space between the groove forming surface and the flat screw facing surface, plasticizes at least part of the material through the rotation of the flat screw and the heat produced by the heater to produce the molding material, and delivers the molding material to the communication hole.

14 Claims, 23 Drawing Sheets

(51) Int. Cl.
  *B29C 45/17* (2006.01)
  *B29C 45/47* (2006.01)
  *B29C 45/60* (2006.01)
  *B29C 45/74* (2006.01)

(52) U.S. Cl.
  CPC .............. *B29C 45/47* (2013.01); *B29C 45/60* (2013.01); *B29C 45/74* (2013.01); *B29C 2945/76167* (2013.01); *B29C 2945/76317* (2013.01); *B29C 2945/76357* (2013.01); *B29C 2945/76484* (2013.01); *B29C 2945/76505* (2013.01); *B29C 2945/76709* (2013.01); *B29C 2945/76869* (2013.01)

(56) References Cited

FOREIGN PATENT DOCUMENTS

| | | |
|---|---|---|
| JP | 2019-130834 A | 8/2019 |
| KR | 20160127661 | * 11/2016 |

* cited by examiner

INJECTION MOLDING APPARATUS

The present application is based on, and claims priority from JP Application Serial Number 2021-086942, filed May 24, 2021, the disclosure of which is hereby incorporated by reference herein in its entirety.

BACKGROUND

1. Technical Field

The present disclosure relates to an injection molding apparatus.

2. Related Art

Regarding injection molding apparatuses, JP-A-2019-130834 discloses an injection molding machine including an injector including an in-line screw. JP-A-2019-130834 describes, as the injection molding machine including the injector, what is called a horizontal injection molding machine that performs die clamping and die opening in the horizontal direction and a vertical injection molding machine that performs die clamping and die opening in the vertical direction.

Arranging the injector and a molding die of a vertical injection molding machine along the vertical direction allows reduction in size of the vertical injection molding machine in the horizontal direction. When the injector including an in-line screw and the molding die are arranged in the vertical direction, however, the entire injection molding machine is elongated in the vertical direction, so that the space where such an injection molding machine is installed is restricted in some cases.

SUMMARY

According to an aspect of the present disclosure, an injection molding apparatus is provided. The injection molding apparatus includes a support that supports a molding die including an upper die and a lower die, and an injection unit that injects a molding material toward a cavity defined by the upper die and the lower die. In a state in which the molding die is supported by the support, the injection unit, the upper die, and the lower die are arranged sequentially from above in a vertical direction. The injection unit includes a rotating flat screw having a groove forming surface in which a groove is formed, a barrel having a flat screw facing surface facing the groove forming surface and having a communication hole into which the molding material flows, and a heater that heats a material supplied to a space between the groove forming surface and the flat screw facing surface, plasticizes at least part of the material through the rotation of the flat screw and the heat produced by the heater to produce the molding material, and delivers the molding material to the communication hole.

DESCRIPTION OF EXEMPLARY EMBODIMENTS

A. First Embodiment

Figure 1:
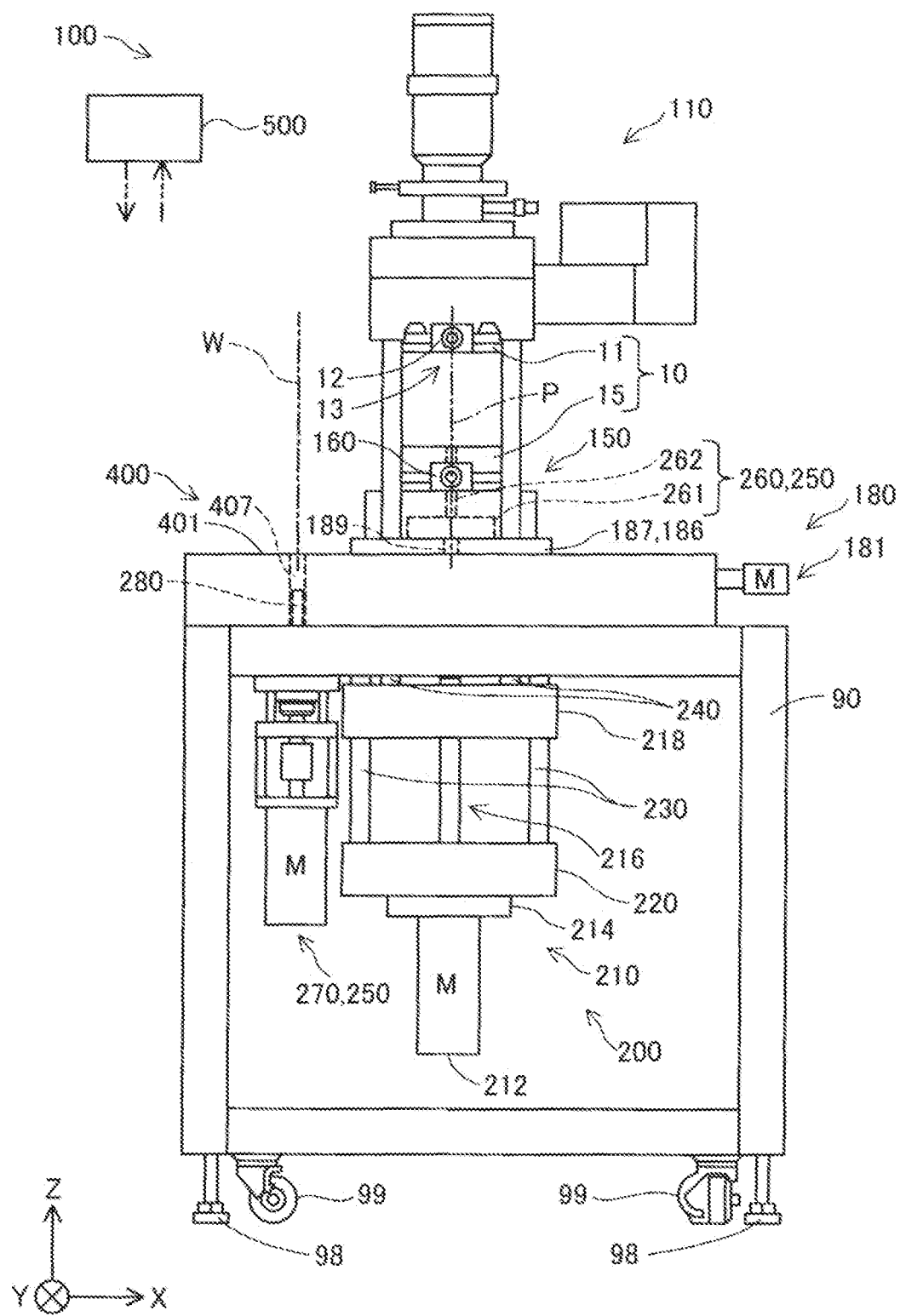
FIG. 1 is a first view showing a schematic configuration of an injection molding apparatus according to a first embodiment.

FIG. 1 is a first view showing a schematic configuration of an injection molding apparatus 100 according to a first embodiment. FIG. 1 shows arrows along directions X, Y, and Z perpendicular to one another. The directions X, Y, and Z are directions along axes X, Y, and Z, which are three spatial axes perpendicular to one another, and each include both a direction toward one side of the corresponding one of the axes X, Y, and Z and a direction opposite the direction toward the one side. The axes X and Y are axes along a horizontal plane, and the axis Z is an axis along a vertical line. A direction −Z is the vertical direction, and a direction +Z is the direction opposite to the vertical direction. The direction −Z is also called "lower", and the direction +Z is also called "upper". The other figures also show the arrows along the directions X, Y, and Z as appropriate. The directions X, Y, and Z in FIG. and the directions X, Y, and Z in the other figures indicate the same directions.

The injection molding apparatus 100 includes an injection unit 110, a lower die support 150, a position changer 180, a die clamper 200, an ejector 250, a base 400, and a controller 500. The base 400 is fixed to an enclosure 90, so that the injection molding apparatus 100 according to the present embodiment is fixed to the enclosure 90. The injection molding apparatus 100 is so configured that a molding die 10 is installable therein. The injection molding apparatus 100 molds a molded product by injecting a molding material described below from the injection unit 110 toward the installed molding die 10. The molding die 10 may be made, for example, of metal, resin, or ceramic. The metal molding die 10 is called a die in some cases.

The enclosure 90 includes wheels 99 at the corners of the bottom surface of the enclosure. The injection molding apparatus 100 is therefore configured to be freely movable. In the present embodiment, bolt-shaped stoppers 98 are provided at the bottom surface of the enclosure 90 so as to be adjacent to the wheels 99. A user can use the stoppers 98 to fix the injection molding apparatus 100 at an installation location.

The controller 500 is formed of a computer including one or more processors, a primary storage device, and an input/output interface via which signals are inputted from and outputted to an external apparatus. The processor reads a program onto the primary storage device and executes the program to allow the controller 500 to control the injection unit 110 and the die clamper 200 to manufacture a molded product.

The molding die 10 includes an upper die 11 and a lower die 15. The upper die 11 and the lower die 15 define a cavity that is a space according to the shape of the molded product. More specifically, the lower surface of the upper die 11 and the upper surface of the lower die 15 are provided with protrusions and recesses that define the cavity, and when the upper die 11 and the lower die 15 are clamped, a cavity having the shape according to the protrusions and the recesses is defined between the upper die 11 and the lower die 15.

The molding die 10 is installed in the injection molding apparatus 100 with the molding die 10 supported by a support of the injection molding apparatus 100. In the present embodiment, the support refers to an upper die support 13, which supports the upper die 11, and a lower die support 150, which supports the lower die 15. The upper die support 13 is configured as a holder fixed to a lower portion of the injection unit 110 and including upper die clamps 12, which fix the upper die 11 by sandwiching the upper die 11 in the direction Y. The lower die support 150 is configured as a holder provided below the upper die support 13 and including lower die clamps 160, which fix the lower die 15 by sandwiching the lower die 15 in the direction Y. FIG. 1 and the other figures that will be described later show the state in which the molding die 10 is installed in the injection molding apparatus 100 unless otherwise noted.

In the state in which the molding die 10 is supported by the support, that is, in the state in which the upper die 11 is supported by the upper die support 13 and the lower die 15 is supported by the lower die support 150, the upper die 11 is located below the injection unit 110 and the lower die 15 is located below the upper die 11, as shown in FIG. 1. That is, in the state in which the molding die 10 is supported by the support, the injection unit 110, the upper die 11, and the lower die 15 are arranged sequentially from above in the vertical direction. In the present embodiment, the upper die 11 and the lower die 15 are both disposed above the base 400 in the state in which the molding die 10 is supported by the support, as shown in FIG. 1.

The die clamper 200 is configured to be capable of clamping and opening the molding die 10 by moving the injection unit 110 and the upper die 11 along the direction Z with the molding die 10 supported by the support. The die clamper 200 includes a die driver 210, a first pillar unit 230, and a second pillar unit 240. The die driver 210 includes a die clamping motor 212, a speed reducer 214, a ball screw 216, a movable disk 218, and a fixed disk 220.

The first pillar unit 230 is formed of four pillars extending in the direction Z. The base 400 is fixed to the upper end of the first pillar unit 230, and the fixed disk 220 of the die driver 210 is fixed to the lower end of the first pillar unit 230. That is, the base 400 and the fixed disk 220 are fixed to each other via the first pillar unit 230. FIG. 1 shows only two pillars disposed on the side facing in the direction −Y out of the four pillars, which form the first pillar unit 230.

The fixed disk 220 has the shape of a flat plate. The fixed disk 220 is so fixed to the lower end of the first pillar unit 230 described above that the plate surfaces of the fixed disk 220 are parallel to the horizontal direction.

The die clamping motor 212 in the present embodiment is formed of a motor with an electromagnetic brake. The die clamping motor 212 uses the electromagnetic brake to generate a braking force in a state in which no voltage is applied to the excitation coil of the motor to restrict the rotation of the motor shaft while allowing rotation of the motor shaft in a state in which voltage is applied to the excitation coil. The die clamping motor 212 is disposed below the lower die 15. More specifically, the die clamping motor 212 is fixed to a lower portion of the fixed disk 220 fixed to the lower end of the first pillar unit 230 with the output shaft of the motor facing upward. The die clamping motor 212 is driven under the control of the controller 500.

The speed reducer 214 is coupled to the output shaft of the die clamping motor 212. The ball screw 216 is coupled to the output shaft of the speed reducer 214. The speed reducer 214 in the present embodiment is a concentric-shaft-type speed reducer having an input shaft and an output shaft aligned with each other along the same axis. The speed reducer 214 is fixed to the fixed disk 220 with the ball screw 216, which is coupled to the speed reducer 214, protruding upward beyond the fixed disk 220.

The movable disk 218 has the shape of a flat plate. The movable disk 218 is so coupled to the ball screw 216 that the plate surfaces of the disk are parallel to the horizontal direction, and the first pillar unit 230 passes through the movable disk 218 in the direction Z. The rotation of the ball screw 216 driven by the die clamping motor 212 moves the movable disk 218 in the direction Z relative to the fixed disk 220 along the first pillar unit 230 serving as a guide with the lower surface of the movable disk 218 facing the upper surface of the fixed disk 220.

The second pillar unit 240 in the present embodiment is formed of four pillars extending in the direction Z. The second pillar unit 240 is provided so as to pass through the base 400 in the direction Z. The movable disk 218 is fixed to the lower end of the second pillar unit 240. The injection unit 110 is fixed to the upper end of the second pillar unit 240. FIG. 1 shows only two pillars disposed on the side facing in the direction −X out of the four pillars, which form the second pillar unit 240.

Figure 2:
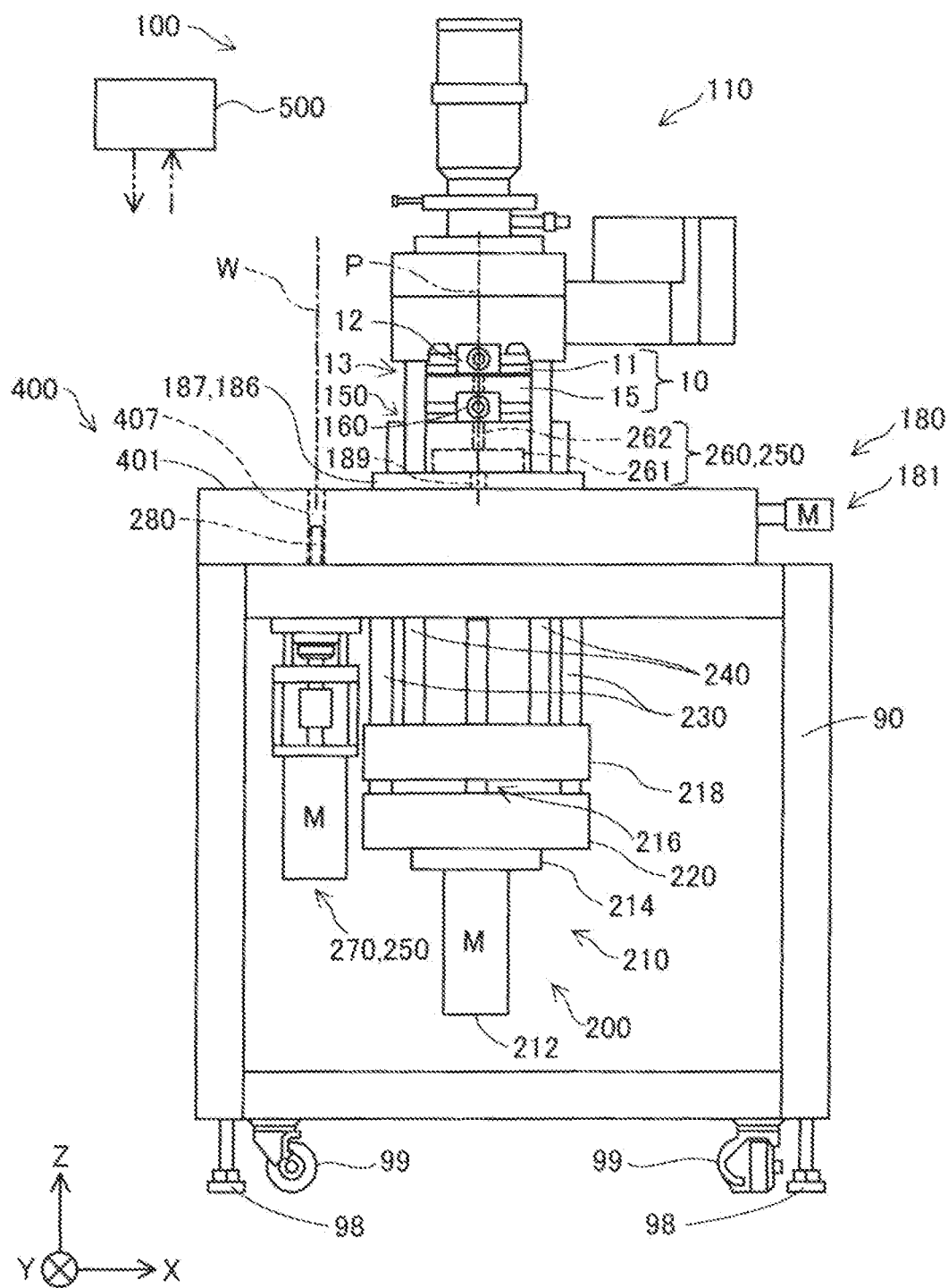
FIG. 2 is a second view showing the schematic configuration of the injection molding apparatus according to the first embodiment.

FIG. 2 is a second view showing the schematic configuration of the injection molding apparatus 100 according to the first embodiment. FIG. 2 shows that the molding die 10 installed in the injection molding apparatus 100 has been clamped. The die clamping motor 212 is driven to allow the die clamper 200 to clamp and open the molding die 10 by moving the injection unit 110 and the upper die 11 along the vertical direction, as shown in FIGS. 1 and 2. In more detail, the driving force produced by the die clamping motor 212 is transmitted to the ball screw 216 via the speed reducer 214 to move the movable disk 218 coupled to the ball screw 216 in the direction Z along the first pillar unit 230, so that the injection unit 110 and the upper die 11 fixed to the movable disk 218 via the second pillar unit 240 are moved in the direction Z. The die clamper 200 can perform the die clamping by moving the movable disk 218 in the direction −Z to move the injection unit 110 and the upper die 11 in the direction −Z relative to the lower die 15. Similarly, the die clamper 200 can perform the die opening by moving the movable disk 218 in the direction +Z to move the injection unit 110 and the upper die 11 in the direction +Z relative to the lower die 15. An injection molding apparatus that performs die opening and die clamping along the vertical direction, such as the injection molding apparatus 100, is called in some cases a vertical injection molding apparatus or a vertical injection molding machine.

The injection molding apparatus 100 according to the present embodiment includes a descent restrictor configured to be capable of restricting the movement of the injection unit 110 and the upper die 11 toward the lower die 15. In the present embodiment, the die clamping motor 212 functions as the descent restrictor. In more detail, the electromagnetic brake of the die clamping motor 212 restricts the rotation of the motor shaft of the die clamping motor 212 in the state in which no voltage is applied to the die clamping motor 212, thereby preventing unintentional rotation of the ball screw 216 due to a downward load exerted by the injection unit 110, the upper die 11, and the movable disk 218. Unintentional downward movement of the injection unit 110 and the upper die 11 is thus suppressed.

The position changer 180 is configured to be capable of linearly moving the lower die support 150 along an intersecting direction that is a direction that intersects with the vertical direction. In the present embodiment, the position changer 180 is configured to be capable of linearly moving the lower die support 150 along the direction X. The position changer 180 includes a movable section 186, which supports the lower die support 150, and an electrically driven actuator 181, which moves the movable section 186. The electrically driven actuator 181 is formed of a ball screw and a motor that rotates the ball screw. The electrically driven actuator 181 is driven to allow the position changer 180 in the present embodiment to cause the movable section 186 to undergo sliding movement in the direction X relative to the base 400. The electrically driven actuator 181 is driven under the control of the controller 500.

Figure 3:
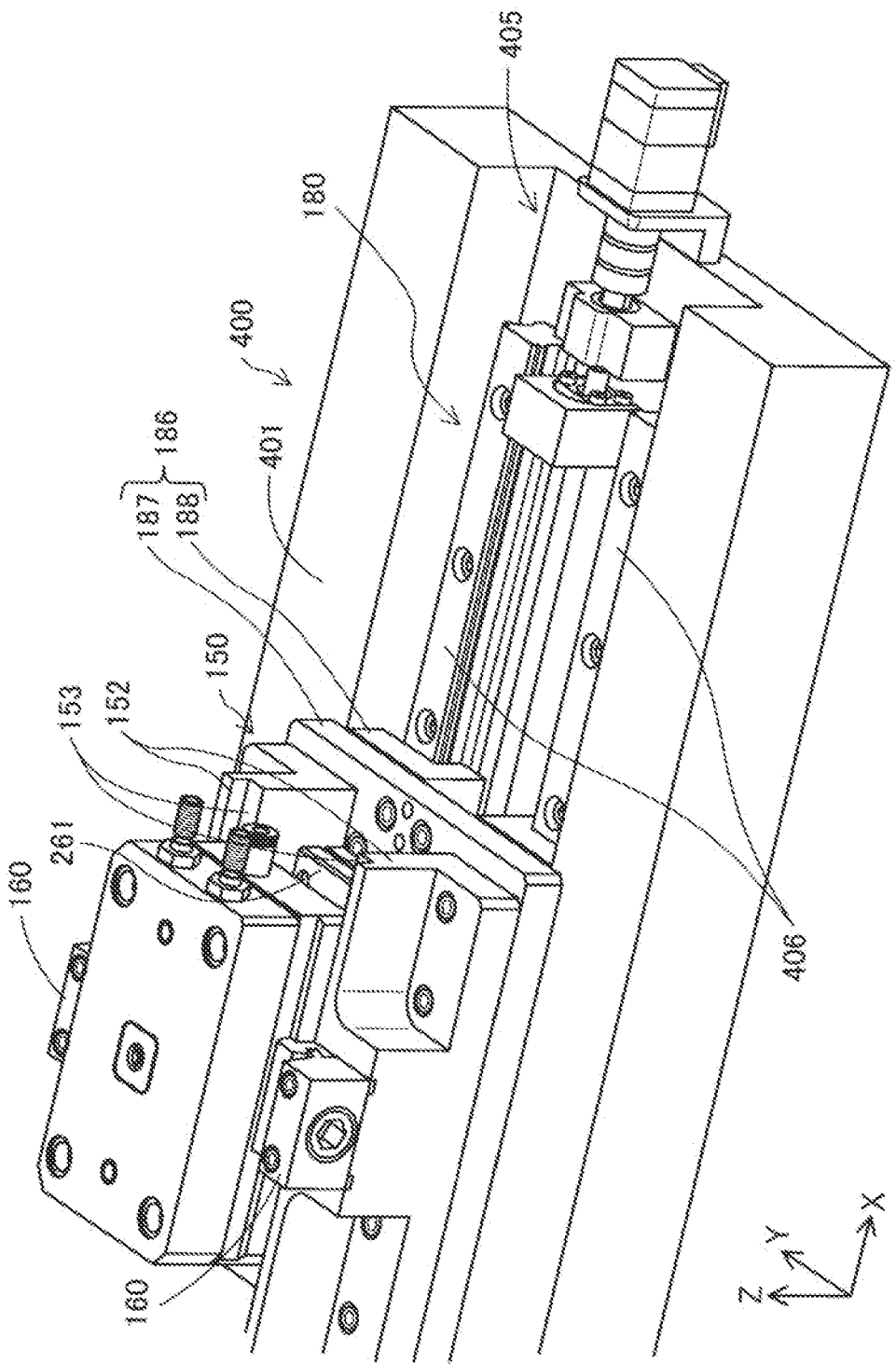
FIG. 3 is a perspective view showing a lower die support and a position changer in the first embodiment.

FIG. 3 is a perspective view showing the lower die support 150 and the position changer 180. In FIG. 3, the second pillar unit 240 is omitted. The electrically driven actuator 181 of the position changer 180 is disposed along the direction X in a depression 405 formed in the base 400, as shown in FIG. 3. The depression 405 is a portion where part of an upper surface 401 of the base 400 is downwardly depressed, and is formed along the direction X.

Linear guides 406 are further provided in the depression 405. The linear guides 406 function as a guide along which the movable section 186 is moved by the electrically driven actuator 181. The linear guides 406 are formed of a pair of rail-shaped members elongated in the direction X and parallel to each other, and are fixed to the bottom surface of the depression 405 with bolts.

The movable section 186 includes a plate section 187, which is a rectangular-plate-shaped member that supports the lower die support 150, and leg sections 188, which support the plate section 187. The plate section 187 and the leg sections 188 are fixed to each other with bolts. The leg sections 188 are coupled to the electrically driven actuator 181. The leg sections 188 are so shaped as to engage with the linear guides 406 in the direction Y. Since the engagement between the leg sections 188 and the linear guides 406 allows movement of the movable section 186 along the direction X but restricts movement of the movable section 186 along the direction Y, the electrically driven actuator 181 can be driven to stably move the movable section 186 along the direction X.

The lower die support 150 described above includes a pair of blocks 152 so disposed as to face each other in the direction Y. The blocks 152 are fixed to the upper surface of the plate section 187 with bolts. The blocks 152 each have an edge section 153, where the lower die 15 is placed. The lower die clamps 160 described above are provided at the upper surfaces of the blocks 152. In more detail, the lower die clamps 160 are provided at the upper surfaces of the blocks 152 in a one-to-one relationship. The lower die clamps 160 fix the lower die 15 placed at the edge sections 153 of the blocks 152 by sandwiching the lower die 15 in the direction Y.

Figure 4:
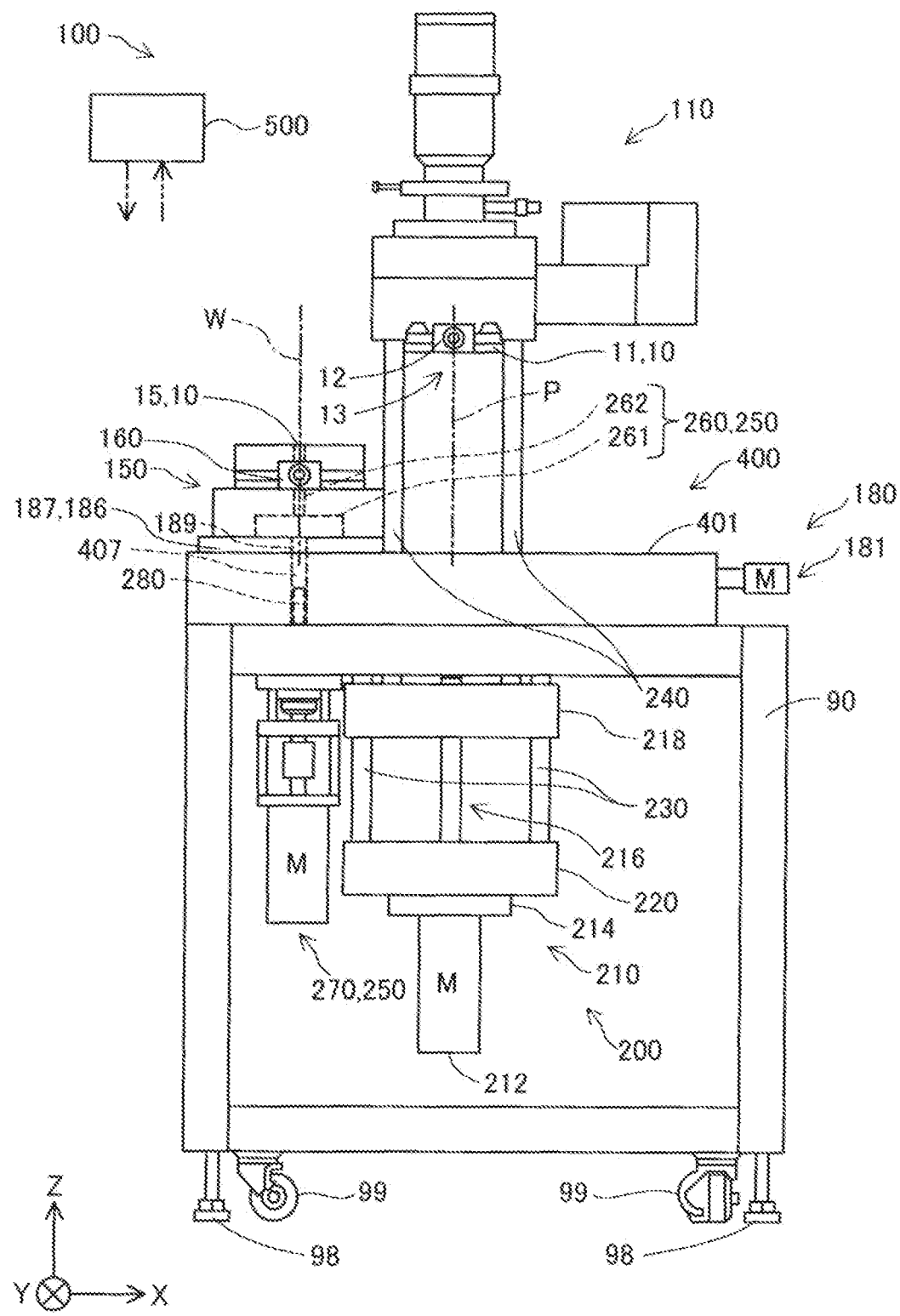
FIG. 4 is a third view showing the schematic configuration of the injection molding apparatus according to the first embodiment.

FIG. 4 is a third view showing the schematic configuration of the injection molding apparatus 100 according to the first embodiment. FIG. 4 shows that the position changer 180 has moved the lower die support 150 to a position shifted in the direction −X from the position of the lower die support 150 shown in FIG. 1. The position changer 180 is configured to be capable of switching two states from one to the other by moving the lower die support 150, a state in which the lower die 15 is located in an injection position P as shown in FIG. 1, and a state in which the lower die 15 is located in a position different from the injection position P as shown in FIG. 4. The injection position P refers to a position where the lower die 15 and the upper die 11 face each other. The position changer 180 in the present embodiment positions the lower die 15 in the injection position P or a standby position W by moving the lower die support 150 in the direction X. The standby position W is a position shifted in the direction −X from the injection position P.

The ejector 250 is a member that removes the molded product from the lower die 15. The ejector 250 in the present embodiment removes the molded product from the lower die 15 in the standby position W described above. The ejector 250 includes a body 260, which lifts the molded product out of the lower die 15, and an ejector driver 270, which causes the body 260 to operate. In the present embodiment, the body 260 is coupled to the lower die 15, and the position changer 180 moves the body 260 along with the lower die 15 along the direction X. The ejector driver 270 is fixed to the base 400.

The body 260 includes a flat-plate-shaped ejector plate 261 and a shaft-shaped ejector pin 262 fixed to the ejector plate 261. The ejector pin 262 is inserted from a position below the lower die 15 into a through hole formed so as to pass through the cavity-defining portion of the lower die 15 in the direction Z, so that the body 260 is coupled to the lower die 15. The ejector plate 261 is disposed between the lower die 15 and the plate section 187 in the direction Z and between the blocks 152, which form the lower die support 150, in the direction Y with the lower die 15 supported by the lower die support 150, as shown in FIG. 3. A hole 189, which passes through the plate section 187 in the direction Z, is provided in the plate section 187 in a position where the hole 189 overlaps with at least part of the ejector plate 261 when viewed along the direction Z, as shown in FIG. 1. In the present embodiment, the hole 189 is provided in a central portion of the plate section 187 in the directions X and Y.

The ejector driver 270 is formed of a ball screw and a motor that rotates the ball screw. The ejector driver 270 is disposed below the base 400 and fixed to the base 400, as shown in FIG. 1. The ejector driver 270 is driven under the control the controller 500.

A contact section 280 is coupled to the ball screw of the ejector driver 270. The contact section 280 is disposed in a cavity 407, which passes through the base 400 in the direction Z.

The ejector driver 270 can lift the body 260 via the contact section 280, which is coupled to the ball screw, by moving the contact section 280 in the direction +Z with the lower die 15 shown in FIG. 4 located in the standby position W. In more detail, the ejector driver 270 is driven to cause the contact section 280 to protrude in the direction +Z out of the cavity 407, further pass through the hole 189 formed in the plate section 187 in the direction +Z, and come into contact with the ejector plate 261. The contact section 280 then further moves in the direction +Z while being in contact with the ejector plate 261 to lift the body 260 in the direction +Z. The ejector pin of the lifted body 260 pushes the molded product in the direction +Z, so that the molded product is removed from the lower die 15.

Figure 5:
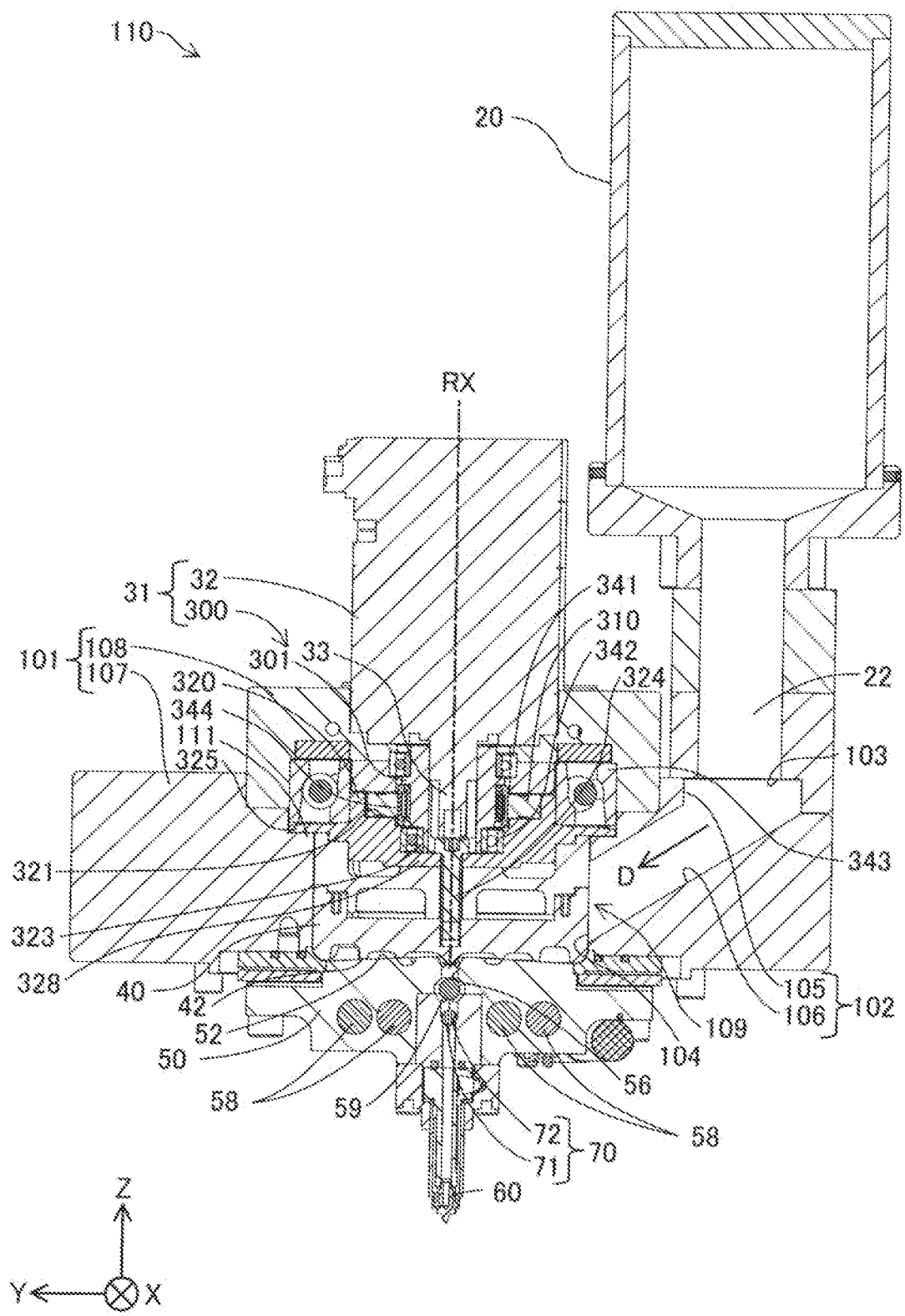
FIG. 5 is a cross-sectional view showing the configuration of an injection unit in the first embodiment.

FIG. 5 is a cross-sectional view showing the configuration of the injection unit 110 in the first embodiment. The injection unit 110 includes a material supplier 20, a rotor 40, a barrel 50, heaters 58, a nozzle 60, and an injection control mechanism 70.

The injection unit 110, in which the rotor 40, the barrel 50, and the heaters 58 plasticize at least part of a material supplied from the material supplier 20 to the space between the rotor 40 and the barrel 50 to produce the molding material, injects the molding material via the nozzle 60 toward the cavity of the molding die 10. In the present embodiment, the term "plasticize" means that a material having thermal plasticity is heated and melted. The term "melted" means not only that a material having thermal plasticity is heated to a temperature higher than or equal to the melting point of the material to be changed into a liquid form, but that the material having thermal plasticity softens when heated to a temperature higher than or equal to the glass transition point so that the material exhibits fluidity.

The material supplier 20 in the present embodiment is formed of a hopper. The material supplier 20 houses a material in the form of pellets, powder, or any other state. In the present embodiment, ABS resin in the form of pellets is used as the material. A supply path 22 is provided below the material supplier 20, as shown in FIG. 5. The supply path 22 is coupled to an introduction path 102 formed in a case 107, which will be described later. The material supplier 20 supplies the space between the rotor 40 and the barrel 50 with the material via the supply path 22 and the introduction path 102.

The rotor 40 is also called a scroll or a flat screw. The rotor 40 is rotationally driven around an axis of rotation RX extending along the direction Z by a rotor driver 31, which is formed of a drive motor 32 and a rotor speed reducer 300. The rotor 40 is rotated by the rotor driver 31 under the control of the controller 500.

The rotor 40 and the rotor speed reducer 300 are housed in a housing 101. The housing 101 includes the case 107 and an upper cover 108. The case 107 is a portion that houses the rotor 40 and the rotor speed reducer 300 so as to surround the circumferences thereof in the horizontal direction. The upper cover 108 is a portion that is disposed above the case 107 so as to cover the rotor 40 and rotor speed reducer 300 from above. The drive motor 32 is so disposed above the upper cover 108 that an output shaft 33 of the drive motor 32 is inserted into the housing 101 via an opening provided in the upper cover 108.

A communication hole 56, through which the produced shaping material flows, is formed at the center of the barrel 50. An injection cylinder 71 of the injection control mechanism 70, which will be described later, is coupled to the communication hole 56. The communication hole 56 is provided with a check valve 59 located in a position upstream from the injection cylinder 71.

Figure 6:
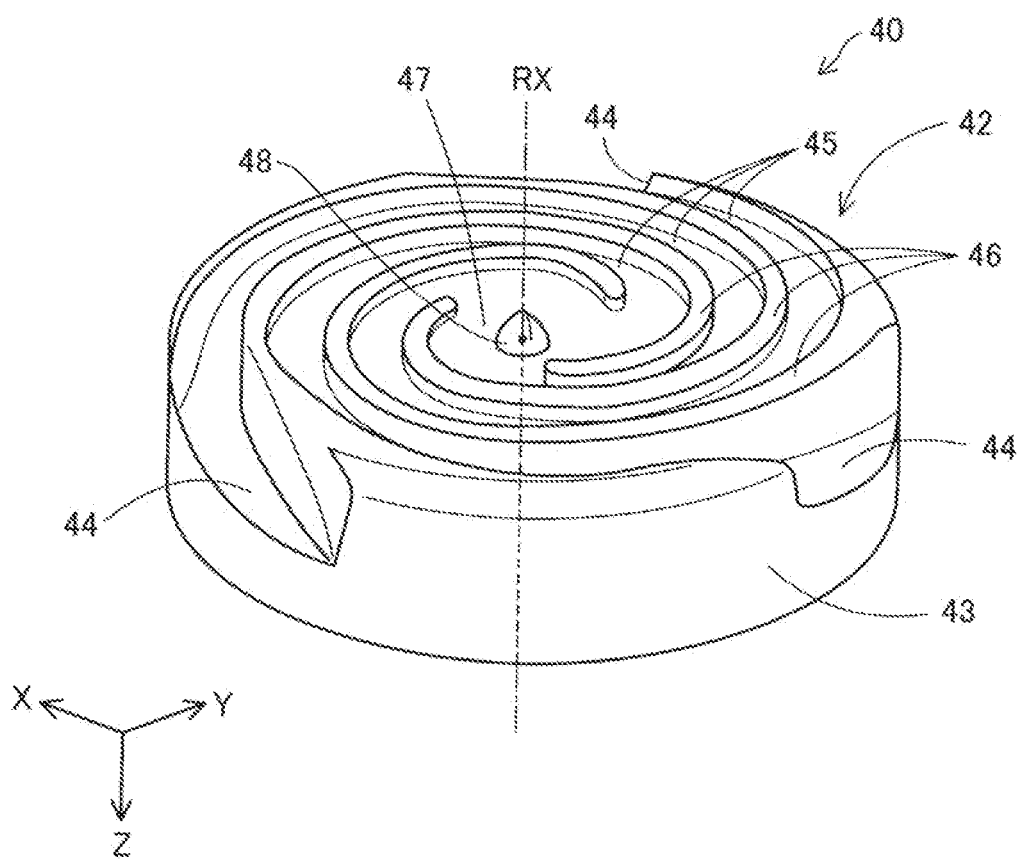
FIG. 6 is a perspective view showing a schematic configuration of a rotor.

FIG. 6 is a perspective view showing a schematic configuration of the rotor 40. The rotor 40 has a substantially columnar shape having a height in the direction along the center axis thereof being smaller than the diameter thereof. The rotor 40 has a groove forming surface 42, which faces the barrel 50, and spiral grooves 45 are formed in the groove forming surface 42 around a central section 47 of the rotor 40. The grooves 45 communicate with a material loading port 44 formed at a rotor side surface 43 of the rotor 40. The material supplied from the material supplier 20 is supplied into the grooves 45 via the material loading port 44. The grooves 45 are formed so as to be separated from each other by convex strips 46. FIG. 6 shows that three grooves 45 are formed by way of example, and the number of grooves 45 may be one or two or more. The grooves 45 do not necessarily have a spiral shape, may instead have a helical shape or the shape of an involute curve, or may extend in an arcuate shape from the center to the periphery.

The rotor 40 in the present embodiment includes a congestion suppressor 48, which is located in the central section 47 and protrudes toward the communication hole 56. In the present embodiment, the congestion suppressor 48 has a substantially conical shape, and the center axis of the congestion suppressor 48 substantially coincides with the axis of rotation RX of the rotor 40. The tip of the congestion suppressor 48 is located in the communication hole 56 formed in the barrel 50. The congestion suppressor 48 efficiently guides the molding material from the central section 47 into the communication hole 56, thereby preventing the molding material from being congested in the central section 47. In other embodiments, the rotor 40 may not include the congestion suppressor 48.

Figure 7:
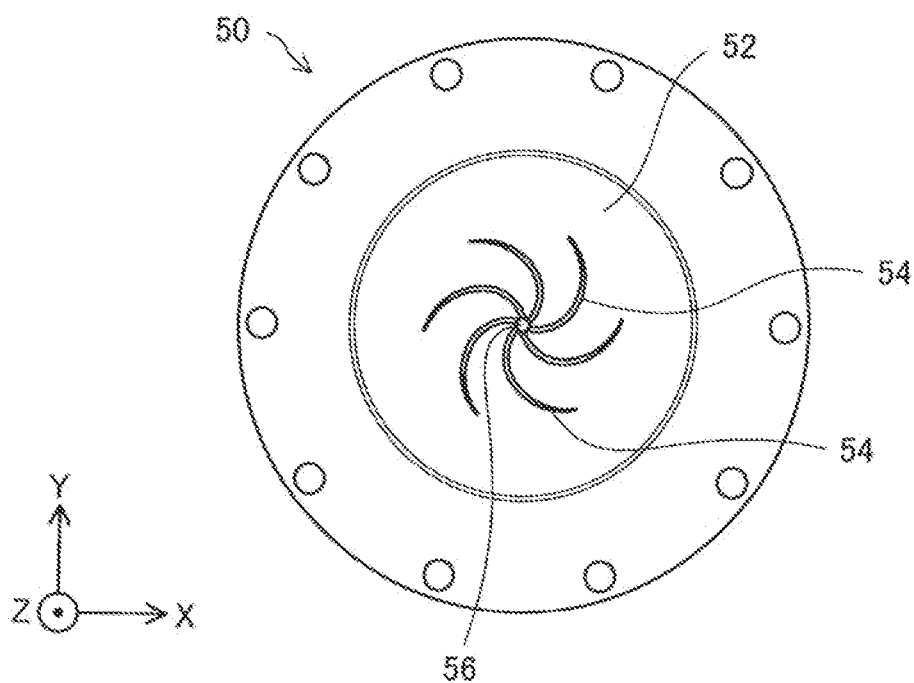
FIG. 7 is a schematic plan view of a barrel.

FIG. 7 is a schematic plan view of the barrel 50. The barrel 50 has a rotor facing surface 52, which faces the groove forming surface 42 of the rotor 40. The communication hole 56 described above is formed so as to open at a central portion of the rotor facing surface 52, as shown in FIG. 7. A plurality of guide grooves 54, which are coupled to the communication hole 56 and extend spirally from the communication hole 56 toward the periphery of the rotor facing surface 52, are formed in the rotor facing surface 52. In other embodiments, the guide grooves 54 may not be coupled to the communication hole 56. The barrel may not be provided with the guide grooves 54.

The heaters 58 heat the material supplied to the space between the groove forming surface 42 of the rotor 40 and the rotor facing surface 52 of the barrel 50. In the present embodiment, four heaters 58 are provided in the barrel 50, as shown in FIG. 5. The output of the heaters 58 is controlled by the controller 500.

The material supplied into the grooves 45 of the rotor 40 is guided by the rotation of the rotor 40 to the central section 47 of the rotor 40 while being plasticized in the space between the groove forming surface 42 of the rotor 40 and the rotor facing surface 52 of the barrel 50 by the rotation of the rotor 40 and the heat produced by the heaters 58. The material flowing to the central section 47 is fed to the communication hole 56 provided at the center of the barrel 50, and is further guided via the communication hole 56 to the injection control mechanism 70.

The injection control mechanism 70 includes the injection cylinder 71 and a plunger 72, as shown in FIG. 5. The injection control mechanism 70 has the function of ejecting the molding material in the injection cylinder 71 and injecting the molding material into the cavity of the molding die 10. The injection control mechanism 70 controls the amount of ejected molding material via the nozzle 60 under the control of the controller 500. The injection cylinder 71 is a substantially cylindrical member coupled to the communication hole 56 of the barrel 50. In the present embodiment, the injection cylinder 71 is disposed along the direction X. The plunger 72 is inserted into and accommodated in the injection cylinder 71. The plunger 72 slides in the interior of the injection cylinder 71 and pumps the molding material in the injection cylinder 71 to the nozzle 60. The plunger 72 is driven by a motor that is not shown.

Figure 8:
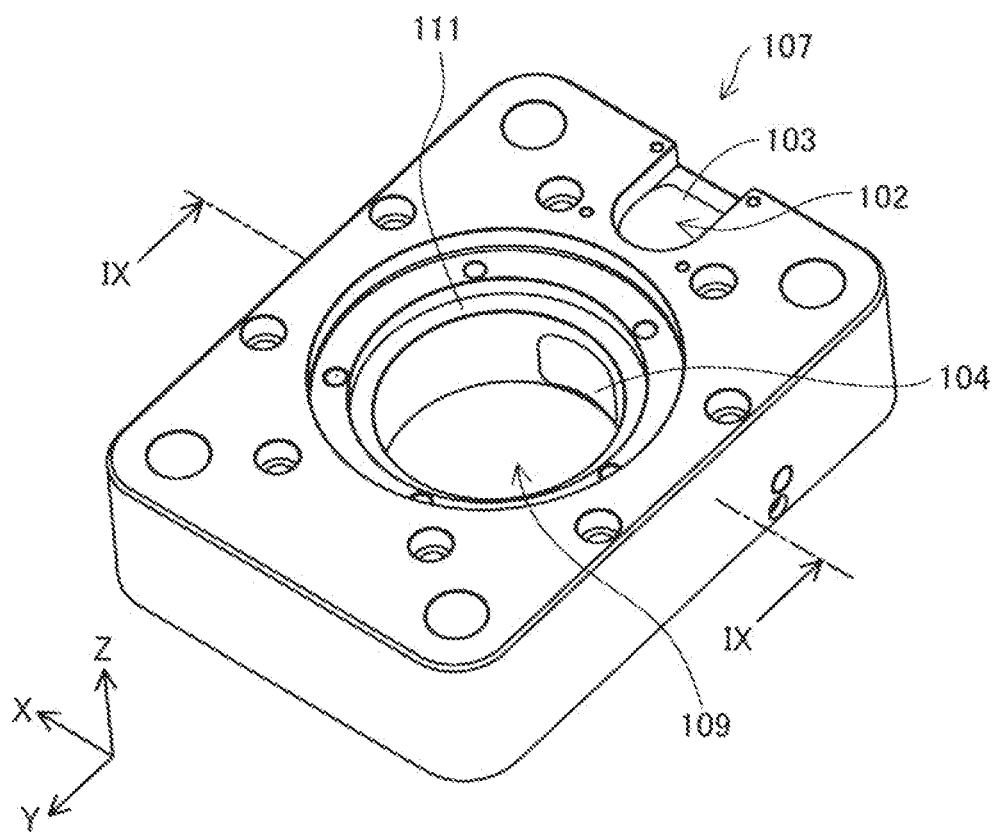
FIG. 8 is a perspective view of a case.
Figure 9:
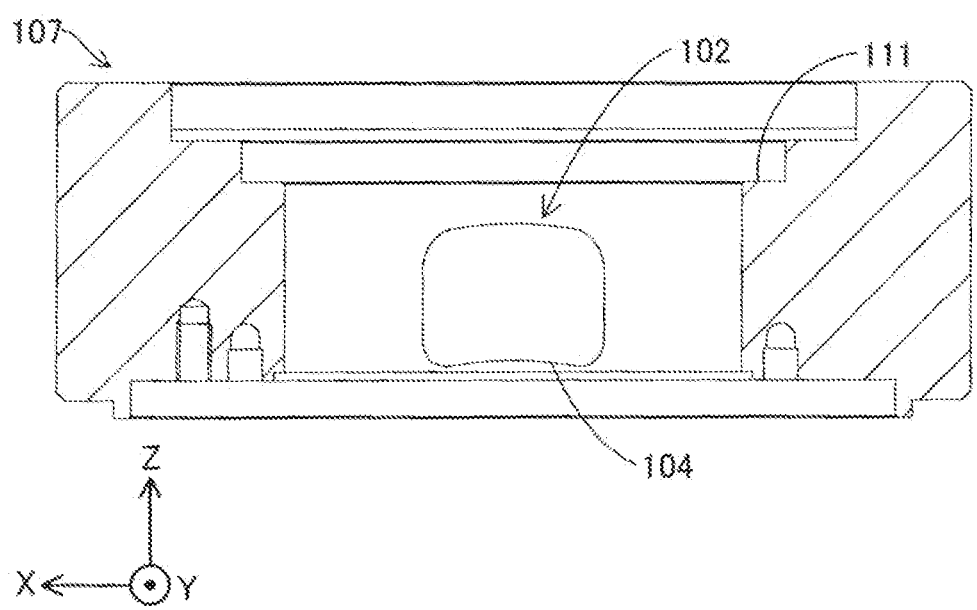
FIG. 9 is a schematic view showing the cross section of the case taken along the line IX-IX in FIG. 8.

FIG. 8 is a perspective view of the case 107. FIG. 9 is a schematic view showing the cross section of the case 107 taken along the line IX-IX in FIG. 8. FIGS. 8 and 9 show the case 107 that does not house the rotor 40.

The introduction path 102 described above is formed in the case 107, as shown in FIGS. 5 and 8. The introduction path 102 has a vertical section 105 and an inclining section 106, as shown in FIG. 5. The vertical section 105 is a portion of the introduction path 102, the portion extending along the vertical direction. The inclining section 106 is a portion of the introduction path 102, the portion extending along an inclination direction D, which inclines with respect to the horizontal and vertical directions. The vertical section 105 is located upstream from the inclining section 106 in the flow direction of the material flowing in the introduction path 102.

The introduction path 102 has one end having an entrance port 103 and another end having an exit port 104, as shown in FIGS. 5 and 8. The entrance port 103 forms the start end of the vertical section 105, and the exit port 104 forms the termination end of the inclining section 106. The entrance port 103 is provided at the upper surface of the case 107. The supply path 22 described above is coupled to the entrance port 103, as shown in FIG. 5. The exit port 104 is provided so as to open toward a space 109 in the case 107, the space for housing the rotor 40, as shown in FIGS. 5 and 8. More specifically, the exit port 104 is provided in a position facing a rotor side surface 43 of the rotor 40 housed in the case 107, as shown in FIG. 5.

The exit port 104 has a rectangular shape elongated in the direction X when viewed along the direction Y, which is the direction in which the rotor side surface 43 and the exit port 104 face each other, as shown in FIG. 9. The fact that the exit port 104 has a shape elongated in the direction X when viewed along the direction Y causes the material flowing in the introduction path 102 to readily spread in the direction X at the exit port 104 along the shape of the exit port 104 as compared, for example, with a case where the exit port 104 has a shape elongated in the direction Z when viewed along the direction Y. The material flowing in the introduction path 102 therefore readily flows to the material loading port 44 provided at the rotor side surface 43 of the rotating rotor 40, so that clogging of the material in the introduction path 102 is suppressed. The fact that the exit port 104 has a rectangular shape when viewed along the direction Y causes the material flowing in the introduction path 102 to readily spread in the direction X at the exit port 104 along the shape of the exit port 104 as compared, for example, with a case where the exit port 104 has a circular shape when viewed along the direction Y. Clogging of the material in the introduction path 102 is thus suppressed.

The rotor speed reducer 300 includes a substantially cylindrical eccentric body 301 fixed to the output shaft 33 of the drive motor 32, a first gear 310 configured as a planetary gear, and a second gear 320 configured as a sun internal gear, as shown in FIG. 5. The rotor speed reducer 300 in the present embodiment is a concentric-shaft-type speed reducer having an input shaft and an output shaft aligned with each other along the same axis.

An end of the eccentric body 301, the end facing the drive motor 32, is supported by a first ball bearing 341 fixed to the upper cover 108. An end of the eccentric body 301, the end facing the rotor 40, is supported by a second ball bearing 342 press-fitted to the inner circumference of the second gear 320. The outer circumference of a portion of the eccentric body 301, the portion fixed to the first ball bearing 341, and the outer circumference of a portion of the eccentric body 301, the portion fixed to the second ball bearing 342, each have a perfect circular shape around the output shaft of the drive motor 32. In contrast, a portion of the eccentric body 301, the portion sandwiched between the first ball bearing 341 and the second ball bearing 342, has a perfect circular shape having a central axis eccentric to the output shaft of the drive motor 32. In the following description, the eccentric body 301, when simply referred to, refers to a portion of the eccentric body 301, the portion sandwiched between the first ball bearing 341 and the second ball bearing 342.

Figure 10:
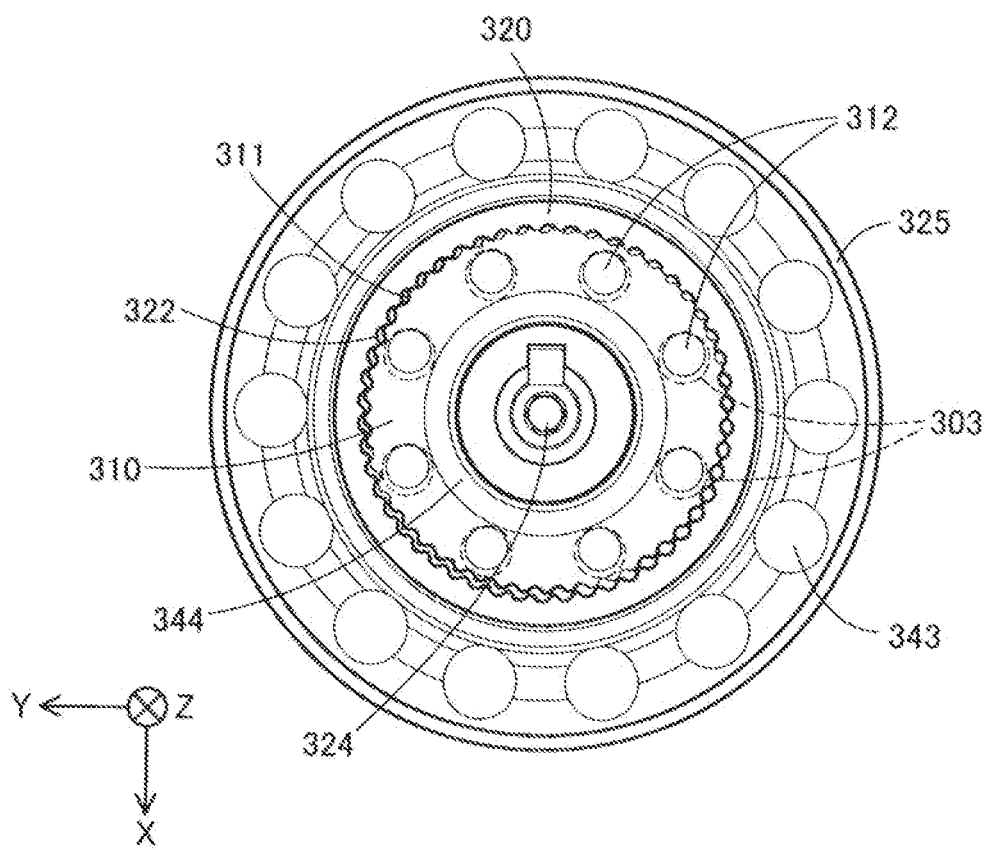
FIG. 10 is a plan view of a first gear and a second gear provided in a speed reducer viewed in a direction −Z.

FIG. 10 is a plan view of the first gear 310 and the second gear 320 provided in the rotor speed reducer 300 viewed in the direction −Z. The first gear 310 has an annular shape, and a needle bearing 344 is press-fitted and fixed to the inner circumference of the first gear 310. Wavy outer teeth 311 are formed at the outer circumference of the first gear 310, as shown in FIG. 10. A plurality of pins 312 are disposed on the first gear 310 at equal intervals in the circumferential direction when viewed in the direction −Z. The pins 312 are each disposed in a pin receiving recess 303. A plurality of pin receiving recesses 303 are formed in an annular pin receiver 302 fixed to the circumference of the eccentric body 301 in the upper cover 108. The pin receiving recesses 303 are open toward the direction −Z side and each have a diameter greater than the diameter of each of the pins 312. The pins 312 are therefore movable in the pin receiving recesses 303 in the directions X and Y, which are directions perpendicular to the axis of rotation RX.

The second gear 320 has a bottomed tubular shape having an end surface facing the direction +Z, as shown in FIG. 5. A first recess 321 is formed at an end surface of the second gear 320, the end surface facing the direction +Z, and a second recess 323 is further formed at the bottom of the first recess 321. The first gear 310 is housed in the first recess 321. Wavy inner teeth 322, with which the outer teeth 311 of the first gear 310 shown in FIG. 10 are in contact, are formed at the inner circumference of the first recess 321. The second ball bearing 342 described above is press-fitted and fixed to the second recess 323.

A depression 49 is formed at an end surface of the rotor 40, the end surface facing the direction +Z, and the bottom 328 of the second gear 320 fits into the depression 49. The depression 49 and the bottom 328 are processed, for example, into a D-letter-shaped cutout so as to prevent idle rotation of the rotor 40. The rotor 40 is fixed to the bottom 328 with a bolt 324 as a fixing portion in the direction of the axis of rotation RX. That is, the rotor 40 is integrated with the second gear 320. Therefore, when the second gear 320 moves along the axis of rotation RX, the rotor 40 also moves along the axis of rotation RX accordingly. The second gear 320 and the rotor 40 is not necessarily fixed to each other with the bolt 324 and may be fixed to each other with another fixing portion, such as a rivet. The number of the bolts 324 is not limited to one, and a plurality of bolts 324 may be used to fix the second gear 320 and the rotor 40 to each other.

A flange-shaped first restrictor 325 is formed at the outer circumference of the second gear 320. The first restrictor 325 will be described later in detail. A portion of the second gear 320, the portion shifted in the direction +Z from the first restrictor 325, is supported by a third ball bearing 343 fixed to the upper cover 108 at the outer circumference side of the pin receiver 302. In the present embodiment, the third ball bearing 343 is configured as a single-row angular bearing that receives a load in the direction +Z from the rotor 40.

The operation of the rotor speed reducer 300 described above will be described. When the drive motor 32 rotates, the eccentric body 301 fixed to the output shaft 33 of the drive motor 32 rotates. The rotating eccentric body 301 comes into partial contact with the needle bearing 344 provided at the inner circumference of the first gear 310. When the eccentric body 301 comes into contact with the needle bearing 344, the first gear 310 receives a driving force from the eccentric body 301 and swings in the directions X and Y, which intersect with the axis of rotation RX, with the pins 312 housed in the pin receiving recesses 303. The movement of the first gear 310 causes the outer teeth 311 of the first gear 310 to sequentially come into partial contact with the inner teeth 322 of the second gear 320, and the second gear 320 rotates in accordance with a predetermined speed reduction ratio determined by the number of outer teeth 311 of the first gear 310 and the number of inner teeth 322 of the second gear 320, so that the rotor 40 fixed to the second gear 320 rotates in the case 107.

The flange-shaped first restrictor 325 is formed at the outer circumference of the second gear 320, as described above. Since the rotor 40 is fixed to the second gear 320, it can be said that the first restrictor 325 is indirectly fixed to the rotor 40.

The case 107 includes a second restrictor 111 facing a surface of the first restrictor 325, the surface facing the direction −Z. The first restrictor 325 is allowed to come into contact with the second restrictor 111. The phrase "allowed to come into contact" means that a non-contact state and a contact state are both achievable. The first restrictor 325 and the second restrictor 111 restrict the movement of the rotor 40 along the axis of rotation RX, in more detail, movement in the direction −Z by a predetermined amount or greater.

The groove forming surface 42 of the rotor 40 is separate from the rotor facing surface 52 by a distance specified in advance with the first restrictor 325 and the second restrictor 111 being in contact with each other. The distance is, for example, 0.1 mm. The distance between the groove forming surface 42 and the rotor facing surface 52 refers to the shortest distance in the positions where the grooves 45 or the guide grooves 54 are not formed.

The space between the first restrictor 325 and the second restrictor 111 may be filled with grease to reduce sliding resistance between the two restrictors, and a low-friction coating made, for example, of fluorine resin may be formed at the surfaces of the two restrictors. Still instead, the first restrictor 325 or the second restrictor 111 may be formed of a member having a small coefficient of friction.

Even when the rotor 40 moves toward the barrel 50 along the axis of rotation RX, the first restrictor 325 fixed to the rotor 40 comes into contact with the second restrictor 111 before the rotor 40 comes into contact with the barrel 50. Therefore, for example, the rotor 40 and the barrel 50 do not come into contact with each other even when the material supplied from the material supplier 20 is temporarily interrupted, or when the material clogs in the supply path 22 or the introduction path 102, for example, during continuous molding. Wear of the rotor 40 and the barrel 50 and the resultant decrease in durability thereof can therefore be suppressed.

The rotor speed reducer 300 in the present embodiment is disposed in a position different from the position of the introduction path 102 provided in the case 107, as shown in FIG. 5. The flow of the material in the introduction path 102 is therefore unlikely to be hindered as compared, for example, with a case where part of the rotor speed reducer 300 is disposed in the introduction path 102, whereby congestion of the material in the introduction path 102 is suppressed. On the other hand, in other embodiments, part of the rotor speed reducer 300 may be disposed in the introduction path 102. For example, an outer circumferential end portion of the first restrictor 325 may be disposed in the introduction path 102.

Figure 11:
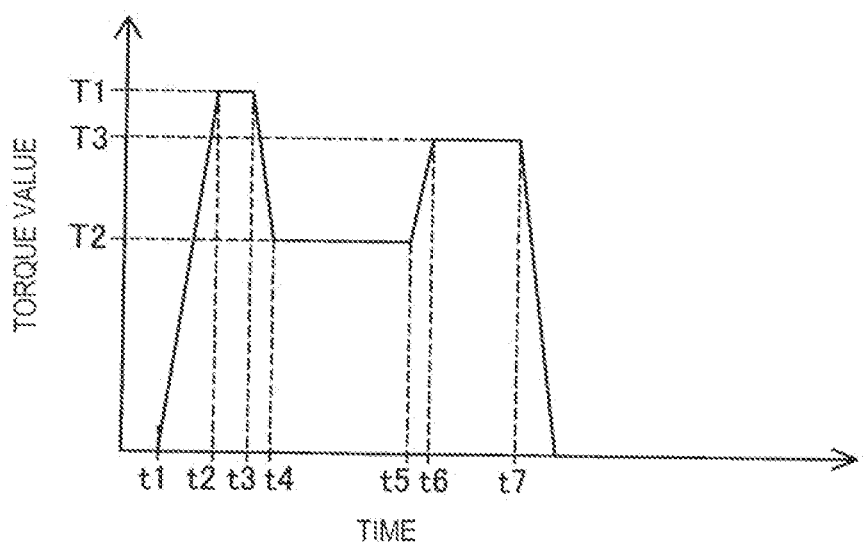
FIG. 11 is a graph showing an example of control of the value of the torque produced by a die clamping motor in an injection step.

FIG. 11 is a graph showing an example of control of the value of the torque produced by the die clamping motor 212 in an injection step in the present embodiment. The injection step refers to the step of injecting the molding material from the injection unit 110 toward the cavity of the clamped molding die 10. The injection step may include a pressure maintaining step of replenishing the cavity with the molding material to compensate for the decrease in the molding material due to contraction of the molding material injected into the cavity. FIG. 11 is a graph in which the horizontal axis represents the time, and the vertical axis represents the value of the torque produced by the die clamping motor 212, and that shows changes in the value of the torque produced by the die clamping motor 212 versus the elapsed time.

In the present embodiment, in the injection step, the controller 500 first controls the die clamping motor 212 in such a way that the value of the torque produced thereby becomes a first torque value Tr1 to press the upper die 11 against the lower die 15 located in the injection position P to start clamping the molding die 10, as shown in FIG. 11. In the example shown in FIG. 11, the controller 500 raises the torque value to the first torque value Tr1 in the period from time t1 to time t2, holds the torque value at the first torque value Tr1 in the period from the time t2 to time t3, and presses the upper die 11 against the lower die 15. Clamping the molding die 10 is started with the lower die 15 and the upper die 11 being in contact with each other in advance. The operation of causing the lower die 15 and the upper die 11 to come into contact with each other prior to the die clamping is called die closing in some cases. The die closing and the die clamping may be performed in succession.

The controller 500 then lowers the value of the torque produced by the die clamping motor 212 from the first torque value Tr1 to a second torque value Tr2 and presses the upper die 11 against the lower die 15. The controller 500 then raises the torque value from the second torque value Tr2 to a third torque value Tr3 and presses the upper die 11 against the lower die 15. In the example shown in FIG. 11, the controller 500 lowers the torque value from the first torque value Tr1 to the second torque value Tr2 in the period from the time t3 to time t4, holds the torque value at the second torque value Tr2 in the period from the time t4 to time t5, and presses the upper die 11 against the lower die 15. The controller 500 then raises the torque value from the second torque value Tr2 to the third torque value Tr3 again in the period from the time t5 to time t6, holds the torque value at the third torque value Tr3 in the period from the time t6 to time t7, and presses the upper die 11 against the lower die 15. In the present embodiment, the controller 500 injects the molding material into the cavity from the injection unit 110 at the time t3, and then maintains the pressure until the time t7.

Lowering the torque value from the first torque value Tr1 to the second torque value Tr2 at the time t3 allows reduction in the load exerted on the die clamping motor 212 as compared, for example, with a case where the torque value is held at the first torque value Tr1 in the period from the time t3 to the time t5. For example, a smaller motor can thus be used as the die clamping motor 212. Furthermore, raising the torque value from the second torque value Tr2 to the third torque value Tr3 at the time t5 suppresses leakage of the molding material from the gap between the upper die 11 and the lower die 15 due to an insufficient torque value as compared, for example, with a case where the torque value is held at the second torque value Tr2 in the period from the time t5 to the time t7. The third torque value Tr3 may, for example, be equal to the first torque value Tr1, but is more preferably smaller than the first torque value Tr1 from the viewpoint of further suppression of the load exerted on the die clamping motor 212. After controlling the die clamping motor 212 in such a way that the torque value becomes the third torque value Tr3, the controller 500 may repeat raising and lowering the torque value again one or more times. For example, the controller 500 may lower the torque value again to the second torque value Tr2 at a point of time after the time t7, and then raise the torque value again to the third torque value Tr3.

After the injection step, the controller 500 opens the molding die 10 by generating a torque acting in the direction opposite from the direction of the torque produced to perform the die clamping. In the present embodiment, the controller 500 increases the maximum value of the torque produced by the die clamping motor 212 in the injection step to a value greater than the maximum value of the torque produced by the die clamping motor 212 to perform the die opening. For example, in the example in FIG. 11 described above, since the maximum torque value in the injection step is the first torque value Tr1, the controller 500 controls the die clamping motor 212 in such a way that the maximum value of the torque produced thereby becomes a value smaller than the first torque value Tr1 in the die opening.

In the injection molding apparatus 100 according to the present embodiment described above, in the state in which the molding die 10 is supported by the support of the injection molding apparatus 100, the injection unit 110, the upper die 11, and the lower die 15 are sequentially arranged from above in the vertical direction, and the injection unit 110 includes the flat screw, the barrel 50, and the heaters 58, plasticizes at least part of the material through the rotation of the flat screw and the heat produced by the heaters 58 to produce the molding material, and feeds the produced molding material to the communication hole 56. The size of the entire injection molding apparatus 100 can therefore be reduced in the vertical direction as compared with a case where the injection unit 110 includes an in-line screw and produces the molding material by using the in-line screw.

In the present embodiment, the injection molding apparatus 100 includes the die clamper 200, which performs the die clamping and the die opening by moving the injection unit 110 and the upper die 11 along the vertical direction with the molding die 10 supported by the support. The aspect described above allows the injection unit 110 and the upper die 11 to move in the vertical direction relative to the lower die 15 to perform the die clamping and the die opening without movement of the lower die 15 in the vertical direction. The molded product can therefore be removed from the lower die 15 at a fixed position in the vertical direction. Therefore, for example, the step of removing the molded product can be more readily automated. Furthermore, when insert molding is so performed that the molding material and an insert member are integrated with each other in the molding die 10, the insert member can be placed in the lower die 15 at a fixed position in the vertical direction. Therefore, for example, the step of placing the insert member in insert molding can be more readily automated.

In the present embodiment, the injection molding apparatus 100 is provided with the descent restrictor, which is configured to be capable of restricting the movement of the injection unit 110 and the upper die 11 in the direction toward the lower die 15. The descent restrictor can therefore suppress unintentional movement of the injection unit 110 and upper die 11 toward the lower die 15.

In the present embodiment, the mold clamper 200 moves the injection unit 110 and the upper die 11 along the direction Z with the aid of the die clamping motor 212 disposed below the lower die 15. The arrangement of the members that form the injection unit 110 is therefore unlikely to be restricted by the arrangement of the die clamping motor 212 as compared with an aspect in which the die clamping motor 212 is disposed above the lower die 15. The degree of freedom of the configuration of the injection unit 110 can therefore be increased.

In the present embodiment, in the injection step, the controller 500 controls the die clamping motor 212 in such a way that the value of the torque produced thereby becomes the first torque value and presses the upper die 11 against the lower die 15, then lowers the value of the torque produced by the die clamping motor 212 from the first torque value to the second torque value and presses the upper die 11 against the lower die 15, and further raises the value of the torque produced by the die clamping motor 212 from the second torque value to the third torque value and presses the upper die 11 against the lower die 15. Therefore, an overload on the die clamping motor 212 can be suppressed, and leakage of the molding material from the molding die 10 can be suppressed.

In the present embodiment, the controller 500 increases the maximum value of the torque produced by the die clamping motor 212 in the die clamping to a value greater than the maximum value of the torque produced by the die clamping motor 212 in the die opening. The load exerted on the die clamping motor 212 can therefore be reduced in the die opening.

B. Second Embodiment

Figure 12:
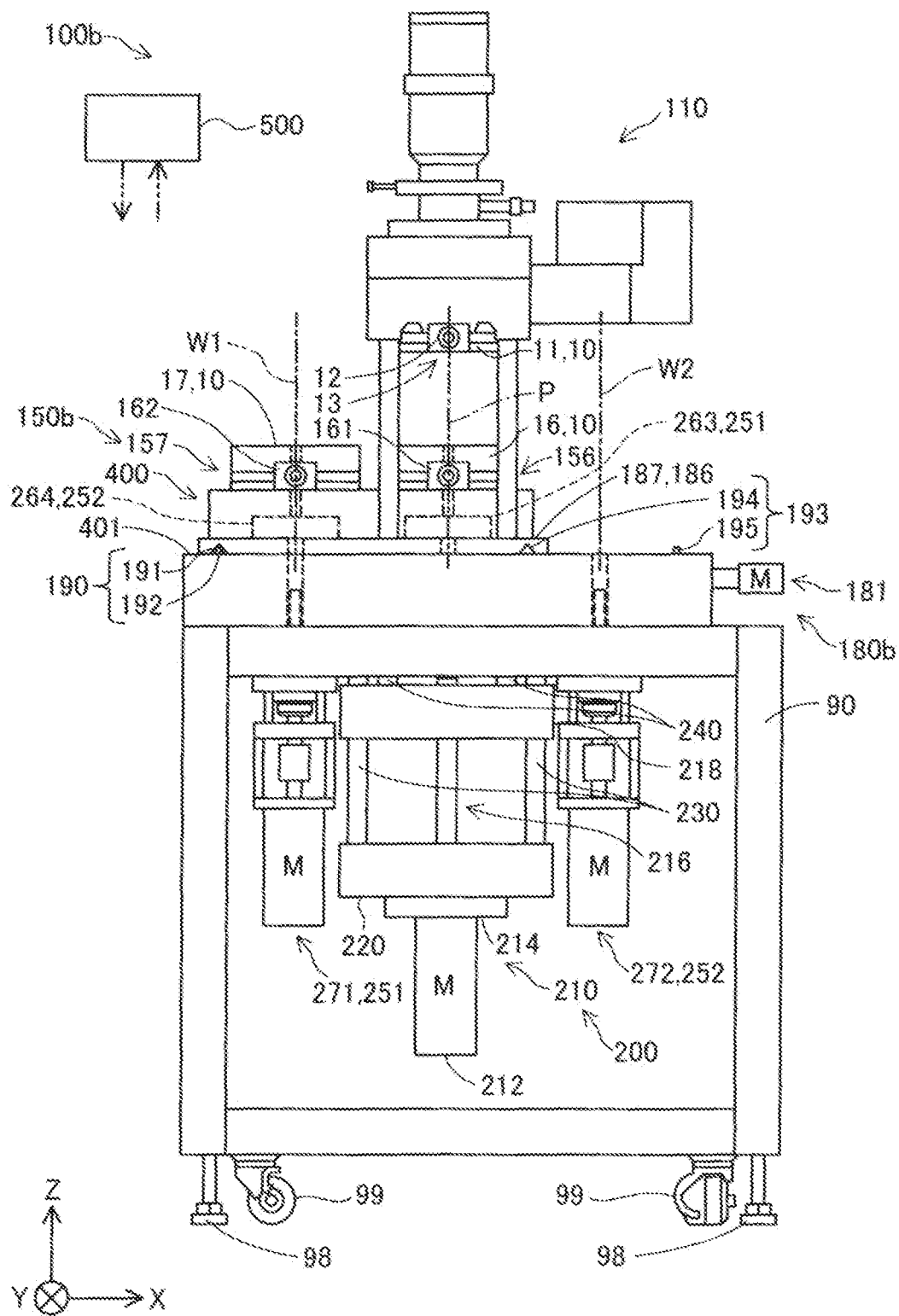
FIG. 12 is a first view showing a schematic configuration of an injection molding apparatus according to a second embodiment.

FIG. 12 is a first view showing a schematic configuration of an injection molding apparatus 100b according to a second embodiment. In the present embodiment, the injection molding apparatus 100b differs from the injection molding apparatus 100 according to the first embodiment in that the first injection molding apparatus 100b includes a first support 156, which supports a first lower die 16 as the lower die, and a second support 157, which supports a second lower die 17 as the lower die. The portions of the configuration of the injection molding apparatus 100b that are not particularly described are the same as those in the first embodiment.

Figure 13:
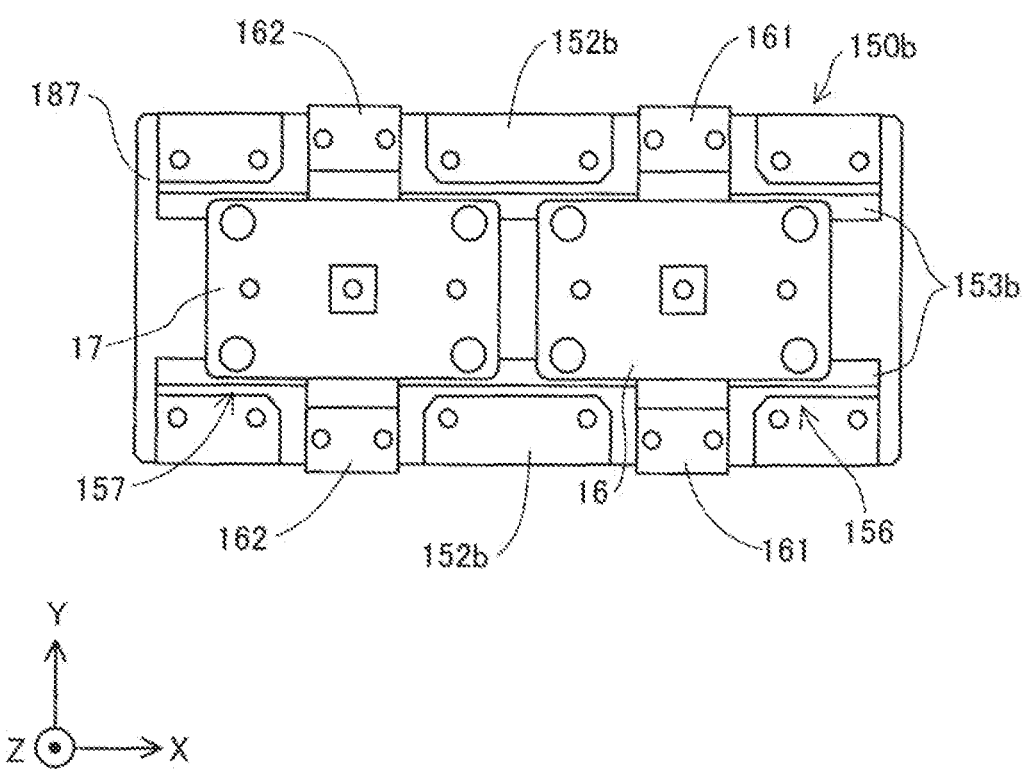
FIG. 13 is a plan view showing a schematic configuration of a lower die support in the second embodiment.

FIG. 13 is a plan view showing a schematic configuration of a lower die support 150b in the second embodiment. FIG. 13 is a top view showing the lower die support 150b and the plate section 187, which supports the lower die support 150b. The lower die support 150b includes the first support 156 and the second support 157 described above, as shown in FIGS. 12 and 13. The first support 156 in the present embodiment is portions that support the first lower die 16 out of the edge sections 153b of a pair of blocks 152b, which form the lower die support 150b. Similarly, the second support 157 is portions that support the second lower die 17 out of the the edge sections 153b of the blocks 152b. The first support 156 is located in a position shifted in the direction +X from the second support 157. A pair of first lower die clamps 161 and a pair of second lower die clamps 162 are provided at the upper surfaces of the blocks 152b. The first lower die clamps 161 fix the first lower die 16 supported by the first support 156 by sandwiching the first lower die 16 in the direction Y, as the lower die clamps 160 described in the first embodiment do. Similarly, the second lower die clamps 162 fix the second lower die 17 supported by the second support 157 by sandwiching the second lower die 17 in the direction Y.

A position changer 180b is configured to be capable of moving the first support 156 and the second support 157. In the present embodiment, the position changer 180b linearly moves the first support 156 and the second support 157 along an intersecting direction that intersects with the vertical direction. More specifically, the electrically driven actuator 181 is driven to cause the position changer 180b to move the movable section 186, which supports the lower die support 150b, in such a way that the movable section 186 slides in the direction X relative to the base 400, as in the first embodiment. The first support 156 and the second support 157 therefore linearly move in conjunction with each other along the direction X.

Figure 14:
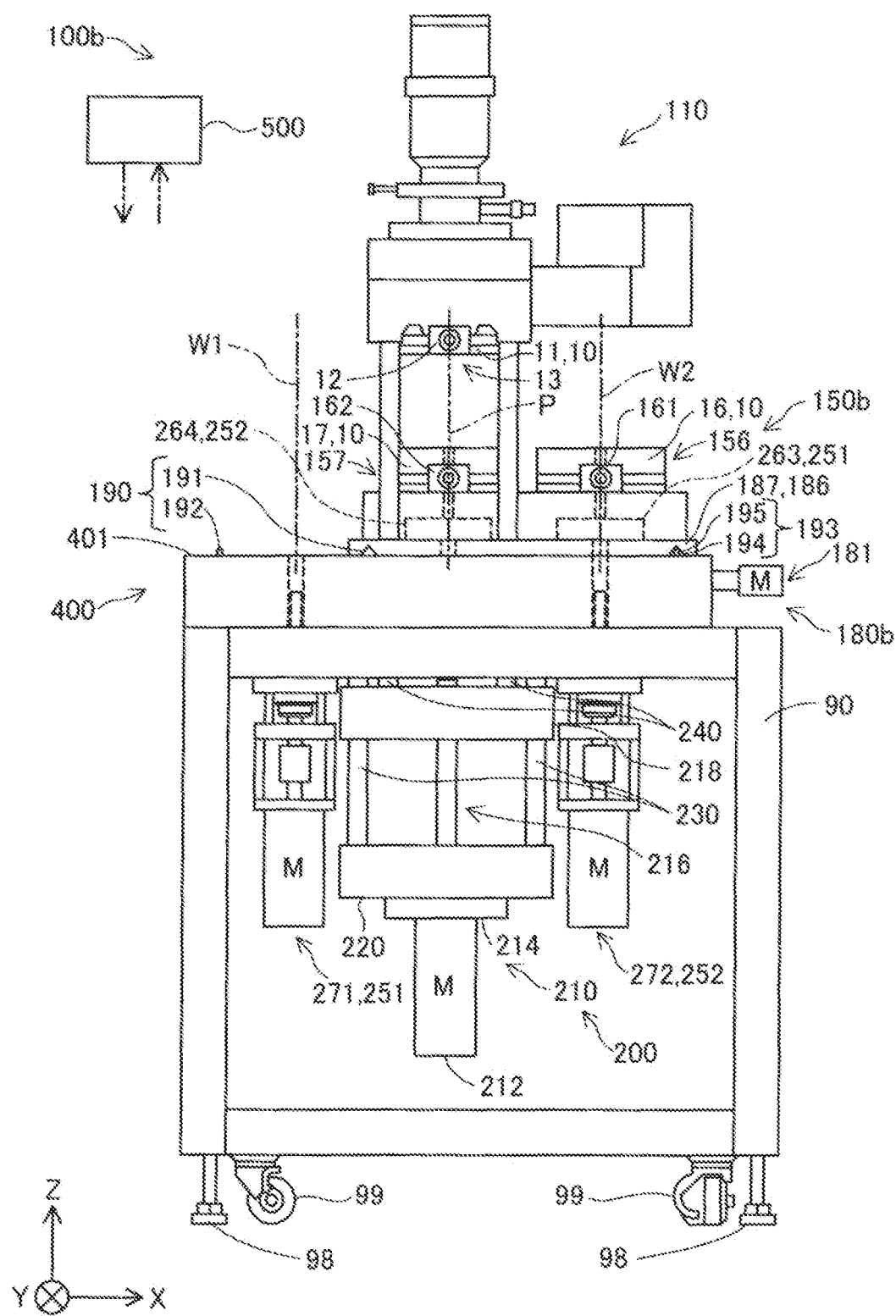
FIG. 14 is a second view showing the schematic configuration of the injection molding apparatus according to the second embodiment.

FIG. 14 is a second view showing the schematic configuration of the injection molding apparatus 100b according to the second embodiment. FIG. 14 shows that the position changer 180b has moved the lower die support 150b to a position shifted in the direction +X from the position of the lower die support 150b shown in FIG. 12. The position changer 180b is configured to be capable of switching the state of the injection molding apparatus 100b between a first state and a second state by moving the first support 156 and the second support 157. The first state refers to a state in which the first lower die 16 is located in the injection position P and the second lower die 17 is located in a position different from the injection position P, as shown in FIG. 12. The second state refers to a state in which the second lower die 17 is located in the injection position P and the first lower die 16 is located in a position different from the injection position P, as shown in FIG. 14.

In the present embodiment, the position changer 180b positions the second lower die 17 in a first standby position W1 in the first state, as shown in FIG. 12. The position changer 180b positions the first lower die 16 in a second standby position W2 in the second state, as shown in FIG. 14. The first standby position W1 and the second standby position W2 both differ from the injection position P. The second standby position W2 is located on the side opposite from the first standby position W1 with the injection position P interposed therebetween in the direction X. That is, the first standby position W1 and the second standby position W2 are separated from each other by the injection position P in the direction X. In the present embodiment, the first standby position W1 is a position shifted in the direction −X from the injection position P, and the second standby position W2 is a position shifted in the direction +X from the injection position P.

The injection molding apparatus 100b according to the present embodiment includes a first positioner 190, which positions the second lower die 17 in the first standby position W1, and a second positioner 193, which positions the first lower die 16 in the second standby position W2, as shown in FIGS. 12 and 14. In the present embodiment, the first positioner 190 and the second positioner 193 each also function as an injection positioner that positions the first lower die 16 or the second lower die 17 in the injection position P. In more detail, the first positioner 190 positions the first lower die 16 in the injection position P and positions the second lower die 17 in the first standby position W1 in the first state. The second positioner 193 positions the second lower die 17 in the injection position P and positions the first lower die 16 in the second standby position W2 in the second state.

The first positioner 190 has a first positioning hole 191 formed in the plate section 187 of the movable section 186 and a first positioning pin 192 provided at the base 400. The first positioning hole 191 is formed as a portion where part of the lower surface of the plate section 187 is upwardly depressed. The first positioning hole 191 in the present embodiment is formed at an end portion of the plate section 187, the end portion facing the direction −X. The first positioning pin 192 is fixed to an end portion of the base 400, the end portion facing the direction −X, with the first positioning pin 192 urged upward by a spring that is not shown so that the upper end of the first positioning pin 192 protrudes upward beyond the upper surface 401 of the base 400. When the first positioning pin 192 is fit into the first positioning hole 191, the plate section 187 is positioned with respect to the base 400 with the first lower die 16 located in the injection position P and the second lower die 17 located in the first standby position W1. Similarly, the second positioner 193 has a second positioning hole 194 formed at an end portion of the plate section 187, the end portion facing the direction +X, and a second positioning pin 195 fixed to an end portion of the base 400, the end portion facing the direction +X. When the second positioning pin 195 is fit into the second positioning hole 194, the plate section 187 is positioned with respect to the base 400 with the second lower die 17 located in the injection position P and the first lower die 16 located in the second standby position W2.

The injection molding apparatus 100b in the present embodiment includes a first ejector 251 and a second ejector 252, as shown in FIGS. 12 and 14. The first ejector 251 is a member that removes the molded product from the second lower die 17 in the first standby position W1. The second ejector 252 is a member that removes the molded product from the first lower die 16 in the second standby position W2.

The configuration of the first ejector 251 and the configuration of the second ejector 252 are the same as the configuration of the ejector 250 described in the first embodiment. That is, the first ejector 251 includes a first body 263, which is coupled to the second lower die 17 and lifts the molded product out of the second lower die 17, and a first ejector driver 271, which causes the first body 263 to operate. Similarly, the second ejector 252 includes a second body 264, which is coupled to the first lower die 16 and lifts the molded product out of the first lower die 16, and a second ejector driver 272, which causes the second body 264 to operate.

The injection molding apparatus 100b according to the present embodiment described above also allows reduction in the size of the entire injection molding apparatus 100b in the vertical direction as compared with the case where the injection unit 110 includes an in-line screw and produces the molding material by using the in-line screw. In the present embodiment, in particular, the injection molding apparatus 100b includes the position changer 180b, which is configured to be capable of moving the first support 156, which supports the first lower die 16, and the second support 157, which supports the second lower die 17, and the position changer 180b moves the first support 156 and the second support 157 to switch the first state to the second state and vice versa, the first state being the state in which the first lower die 16 is located in the injection position P and the second lower die 17 is located in a position different from the injection position P, the second state being the state in which the second lower die 17 is located in the injection position P and the first lower die 16 is located in a position different from the injection position P. Therefore, for example, while a molded product is molded by using one of the lower dies that is located in the injection position P, a molded product can be removed from the other lower die located in the position different from the injection position P. The first lower die 16 and the second lower die 17 can therefore be used to efficiently mold the molded products. Furthermore, when insert molding is performed, while the insert molding is performed by using one of the lower dies that is located in the injection position P, the insert member can be placed in the other lower die located in the position different from the injection position P. The first lower die 16 and the second lower die 17 can therefore be used to efficiently perform the insert molding.

In the present embodiment, the injection molding apparatus 100b includes the injection positioner, which positions the first lower die 16 or the second lower die 17 in the injection position P. The injection positioner can therefore position the first lower die 16, which moves as the first support 156 moves, or the second lower die 17, which moves as the second support 157 moves, in the injection position P, whereby the injection molding can be efficiently performed.

In the present embodiment, the position changer 180b linearly moves the first support 156 and the second support 157 along the direction X to position the second lower die 17 in the first standby position W1 in the first state, and position the first lower die 16 in the second standby position W2, which is located on the side opposite from the first standby position W1 with the injection position P sandwiched therebetween in the X direction, in the second state. The position changer 180b can therefore readily switch the first state to the second state and vice versa by linearly moving the first support 156 and the second support 157 along the direction X.

In the present embodiment, the injection molding apparatus 100b includes the first positioner 190, which positions the second lower die 17 in the first standby position W1, and the second positioner 193, which positions the first lower die 16 in the second standby position W2. Therefore, when one of the first lower die 16 and the second lower die 17 is located in the injection position P, the other is positioned in the corresponding standby position. Therefore, for example, the removal of the molded product from the first lower die 16 or the second lower die 17 and the placement of the insert member in the first lower die or the second lower die 17 can be performed more efficiently in the corresponding standby position. Furthermore, the step of removing the molded product and the step of placing the insert member can be more readily automated.

In the present embodiment, the injection molding apparatus 100b includes the first ejector 251, which removes the molded product from the second lower die 17 in the first standby position W1, and the second ejector 252, which removes the molded product from the first lower die 16 in the second standby position W2. Regardless of the first state or the second state, the molded product can be readily removed from the first lower die 16 or the second lower die 17 by using the first ejector 251 or the second ejector 252.

C. Third Embodiment

Figure 15:
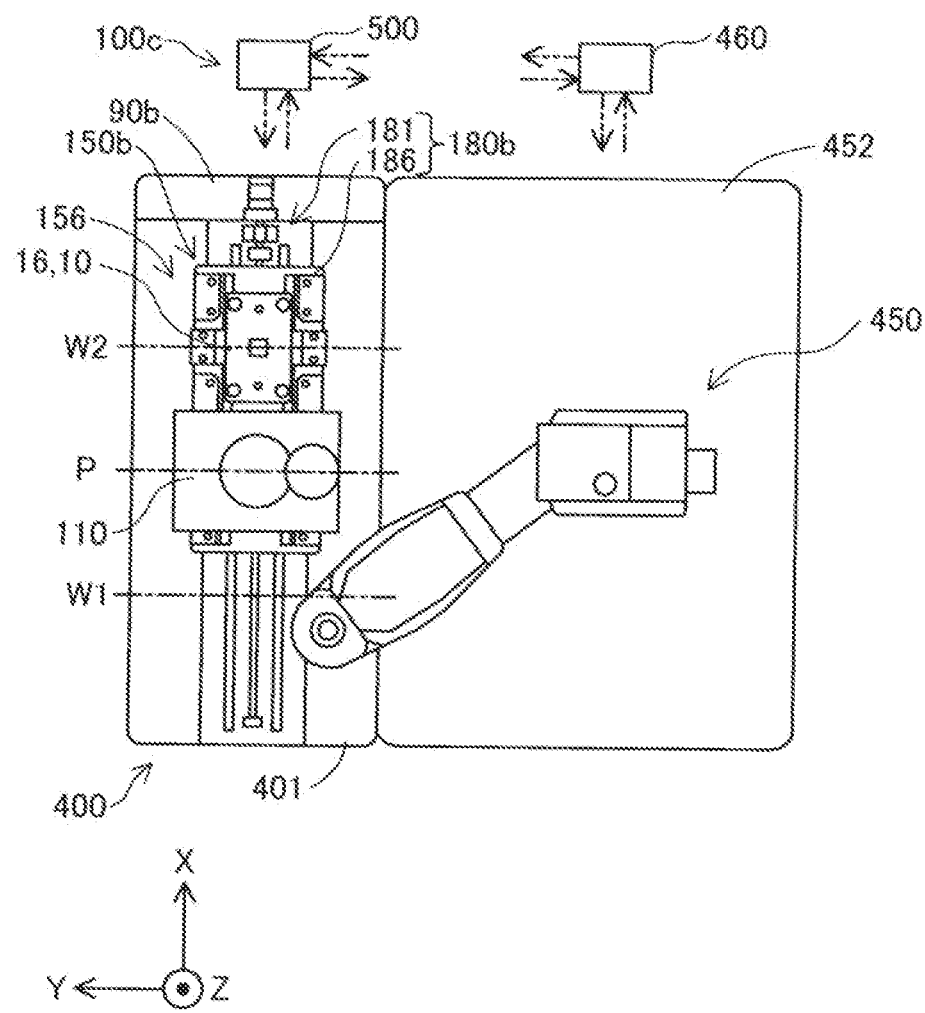
FIG. 15 is a plan view showing a schematic configuration of an injection molding apparatus according to a third embodiment.

FIG. 15 is a plan view showing a schematic configuration of an injection molding apparatus 100c according to a third embodiment. FIG. 15 shows the injection molding apparatus 100c viewed from above. In FIG. 15, the second lower die 17 and the second support 157 are located below the injection unit 110 and are not shown in FIG. 15. The injection molding apparatus 100c according to the present embodiment includes a robot 450 unlike in the second embodiment. The portions of the configuration of the injection molding apparatus 100c according to the present embodiment that are not particularly described are the same as those in the second embodiment.

The robot 450 in the present embodiment is formed of a horizontally articulated robot and includes an arm and a robot controller 460. An end effector is attached to the arm of the robot 450. In the present embodiment, a suction pad that sucks the molded product and the insert member is attached as the end effector to the arm. The robot 450 is installed on a robot base 452 fixed to an enclosure 90b. In other embodiments, the robot 450 is not necessarily a horizontally articulated robot and may, for example, be an orthogonally operating robot or a vertically articulated robot.

The robot controller 460 is formed of a computer, as the controller 500 is. The robot controller 460, in which the processor executes a program and instructions read onto the primary storage device to control the operation of the arm and the end effector, causes the robot 450 to perform a variety of functions. In the present embodiment, the robot 450 is controlled by the controller 500 via the robot controller 460.

In the present embodiment, the robot 450 functions as a transport robot and a material supply robot. The transport robot refers to a robot that transports the molded product removed from the first lower die 16 in the second standby position W2 and the molded product removed from the second lower die 17 in the first standby position W1. The material supply robot refers to a robot that places the insert member in the first lower die 16 located in the second standby position W2 and in the second lower die 17 located in the first standby position W1. In the present embodiment, the robot 450 transports the molded product and places the insert member in the lower dies by sucking and transporting the molded product and the insert member with the aid of the suction pad.

The molded product having been removed from the first lower die 16 or the second lower die 17 is transported by the robot 450 that functions as the transport robot, for example, to a location where the molded product is visually inspected or packed. The visual inspection and packing of the molded product may be performed, for example, on the robot base 452. In this case, for example, an inspection apparatus and a packing apparatus may be installed on the robot base 452.

The end effector attached to the arm of the robot 450 may include, for example, a portion that sucks the molded product and a portion that sucks the insert member. When the robot 450 in the aspect described above functions as the transport robot and the material supply robot as in the present embodiment, the robot 450 can suck the molded product removed from one of the lower dies while sucking the insert member, whereby the distance over which the arm travels from the timing of the suction of the molded product removed from the lower die to the timing of the placement of the insert member in the lower die can be reduced. The injection molding can therefore be performed more efficiently. The end effector may, for example, be formed of a gripper that grips the molded product and the insert member in place of a suction pad. In this case, the end effector may include, for example, a portion that grips the molded product and a portion that grips the insert member.

The injection molding apparatus 100c according to the present embodiment described above also allows reduction in the size of the entire injection molding apparatus 100c in the vertical direction as compared with the case where the injection unit 110 includes an in-line screw and produces the molding material by using the in-line screw. In the present embodiment, in particular, the injection molding apparatus 100c includes the transport robot that transports the molded product removed from the first lower die 16 in the second standby position W2 and the molded product removed from the second lower die 17 in the first standby position W1. The step of transporting the molded product removed from each of the first lower die 16 and the second lower die 17 to the next step can therefore be automated, whereby the molded product can be molded more efficiently.

In the present embodiment, the injection molding apparatus 100c includes the material supply robot that places the insert member in the first lower die 16 located in the second standby position W2 and in the second lower die 17 located in the first standby position W1. The step of placing the insert member in each of the first lower die 16 and the second lower die 17 can therefore be automated, whereby the insert molding can be performed more efficiently.

D. Fourth Embodiment

Figure 16:
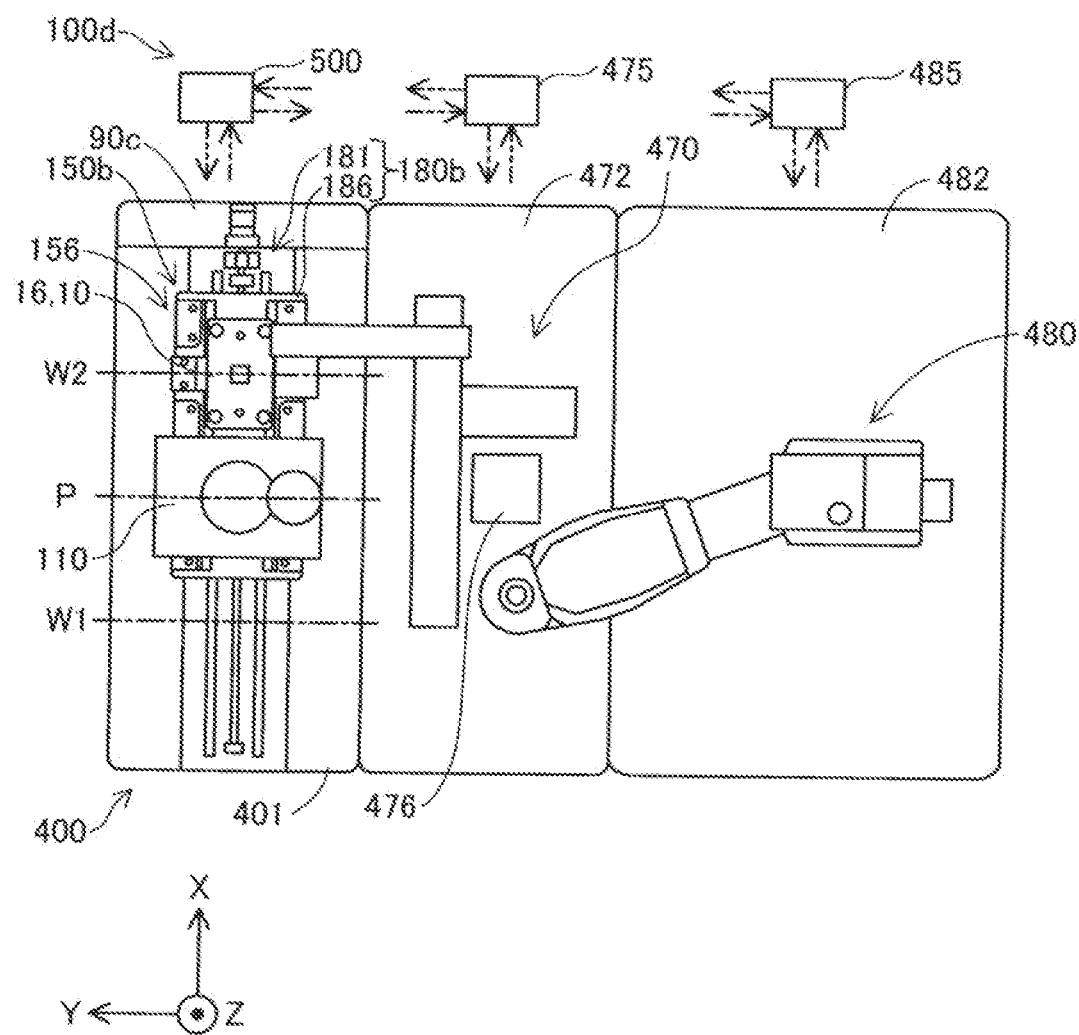
FIG. 16 is a plan view showing a schematic configuration of an injection molding apparatus according to a fourth embodiment.

FIG. 16 is a plan view showing a schematic configuration of an injection molding apparatus 100d according to a fourth embodiment. FIG. 16 shows the injection molding apparatus 100d viewed from above, as in FIG. 15 described above. The injection molding apparatus 100d according to the present embodiment includes a first robot 470 and a second robot 480. The portions of the configuration of the injection molding apparatus 100d that are not particularly described are the same as those in the third embodiment.

The first robot 470 is installed at a first robot base 472 fixed to an enclosure 90c. The second robot 480 is installed at a second robot base 482 fixed to the enclosure 90c. In the present embodiment, the first robot 470 functions as the transport robot and the material supply robot, as the robot 450 described in the third embodiment does. The second robot 480 is a robot that relays the first robot 470 that functions as the transport robot to the inspection step or the packing step.

The first robot 470 is formed of a 3-axis orthogonally operating robot. The first robot 470 includes a first robot controller 475 and an arm formed of three slide shafts along the axes X, Y, and Z. An end effector is attached to the arm of the first robot 470. In the present embodiment, a suction pad is attached as the end effector to the arm of the first robot 470. The first robot controller 475 is configured by a computer, as the robot controller 460 described in the third embodiment is, and controls the operation of the arm and the end effector of the first robot 470 to cause the first robot 470 to function as the transport robot and the material supply robot. In the present embodiment, the first robot 470 is controlled by the controller 500 via the first robot controller 475.

The second robot 480 is formed of a horizontally articulated robot, as the robot 450 described in the third embodiment is, and includes an arm to which an end effector is attached and a second robot controller 485. The second robot 480 is controlled by the controller 500 via the second robot controller 485.

In the present embodiment, the molded product removed from the first lower die 16 or the second lower die 17 is transported by the first robot 470 that functions as the transport robot to a temporary placement table 476 provided on the first robot base 472. The second robot 480 transports the molded product placed on the temporary placement table 476 by the first robot 470 to the location where the molded product is visually inspected or where the molded product is packed.

In other embodiments, the first robot 470 is not necessarily an orthogonally operating robot and may be any other robot. Similarly, the second robot 480 is not necessarily a horizontally articulated robot and may be any other robot. The first robot 470 and the second robot 480 may be identical to each other. The end effector attached to the arm of the first robot 470 may include, for example, a portion that sucks the molded product and a portion that sucks the insert member as in the case of the robot 450 described in the third embodiment, or the end effector may be formed of a gripper.

Also in the injection molding apparatus 100d according to the present embodiment described above, the step of transporting the molded product removed from each of the lower dies to the following step and the step of placing the insert member in the lower die can be automated, whereby the injection molding can be efficiently performed, as in the third embodiment. In the present embodiment, in particular, the injection molding apparatus 100d includes the first robot 470 and the second robot 480. Therefore, for example, arranging the first robot 470 and the second robot 480 in such a way that the ranges over which the arms of the robots are movable are complementary to each other increases the possibility of more efficient injection molding.

In other embodiments, the injection molding apparatus 100d may include no transfer robot or material supply robot. For example, an injection molding system that manufactures a molded product may be formed of the injection molding apparatus 100 including no robot, a transfer robot, and a material supply robot. Also in the aspect described above, the step of transporting the molded product removed from each of the lower dies to the following step and the step of placing the insert member in the lower die can be automated, and the injection molding can be efficiently performed, as described in the third and fourth embodiments. The injection molding apparatus 100 may include, for example, only one of the transfer robot and the material supply robot. Similarly, the injection molding system may include only one of the transfer robot and the material supply robot.

E. Fifth Embodiment

Figure 17:
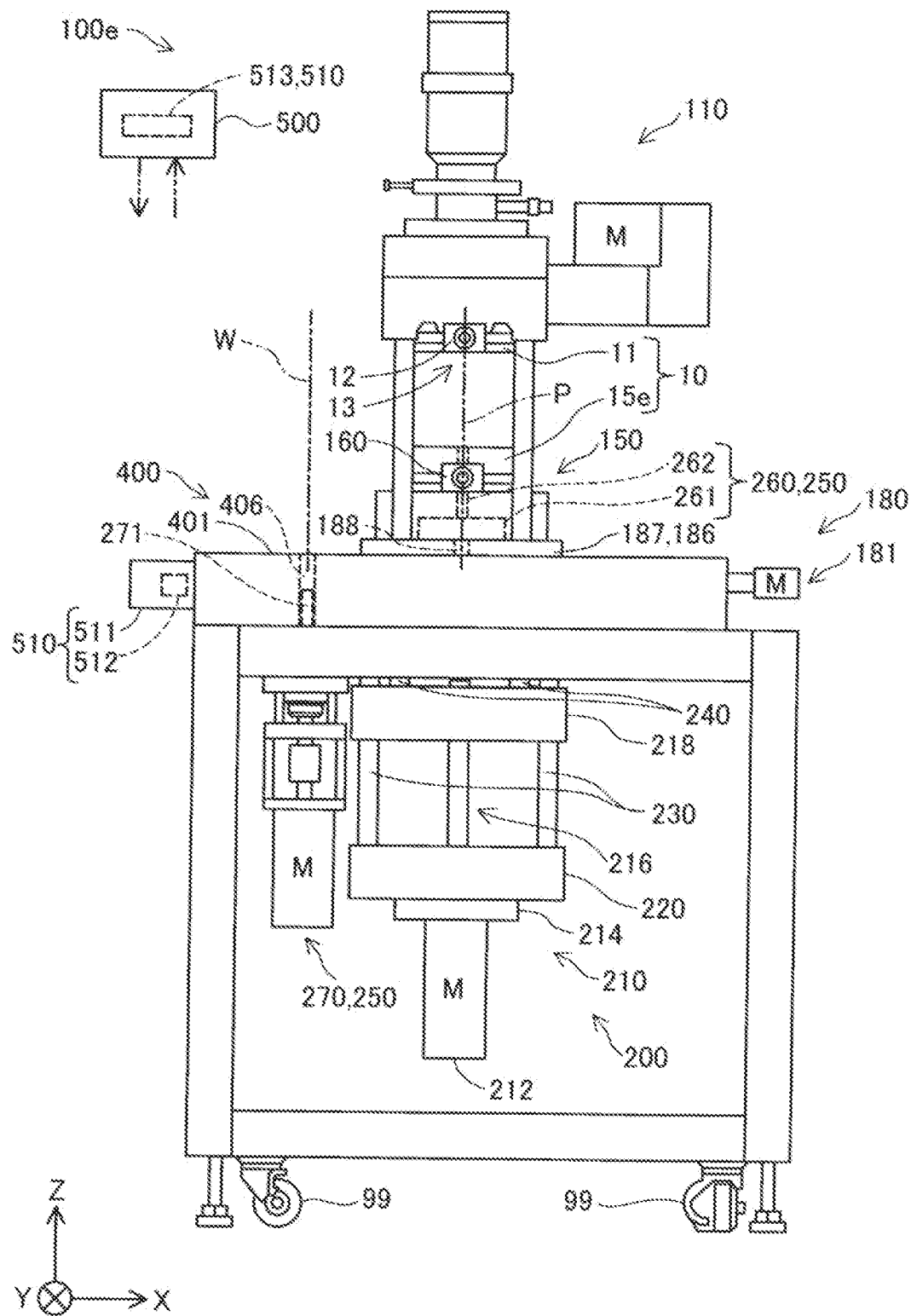
FIG. 17 shows a schematic configuration of an injection molding apparatus according to a fifth embodiment.

FIG. 17 shows a schematic configuration of an injection molding apparatus 100e according to a fifth embodiment. The injection molding apparatus 100e according to the present embodiment differs from the injection molding apparatus 100c according to the third embodiment in that the injection molding system 100e includes an insert detector 510, which detects whether or not the insert member has been placed in an insert position in a lower die 15e. The insert position is a position specified in advance as a position where the insert member is placed in the lower die 15e. The portions of the configuration of the injection molding apparatus 100e that are not particularly described are the same as those in the first embodiment.

Figure 18:
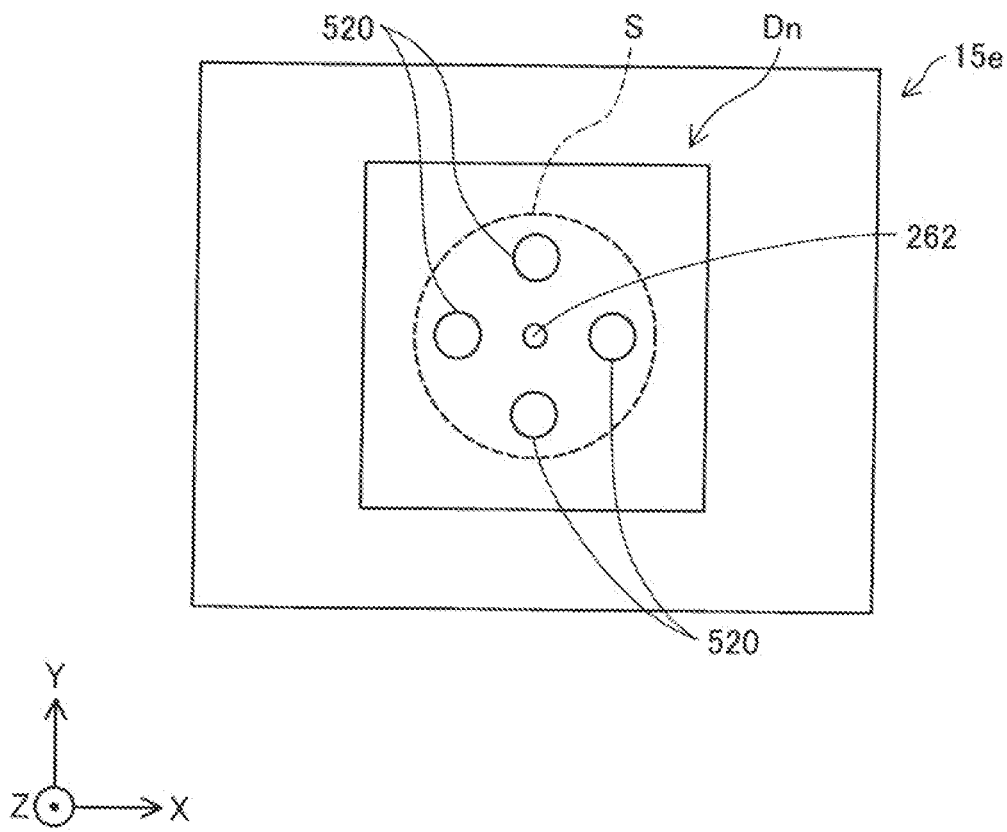
FIG. 18 is a plan view showing a central portion of a lower die and portions around the central portion in the fifth embodiment.
Figure 19:
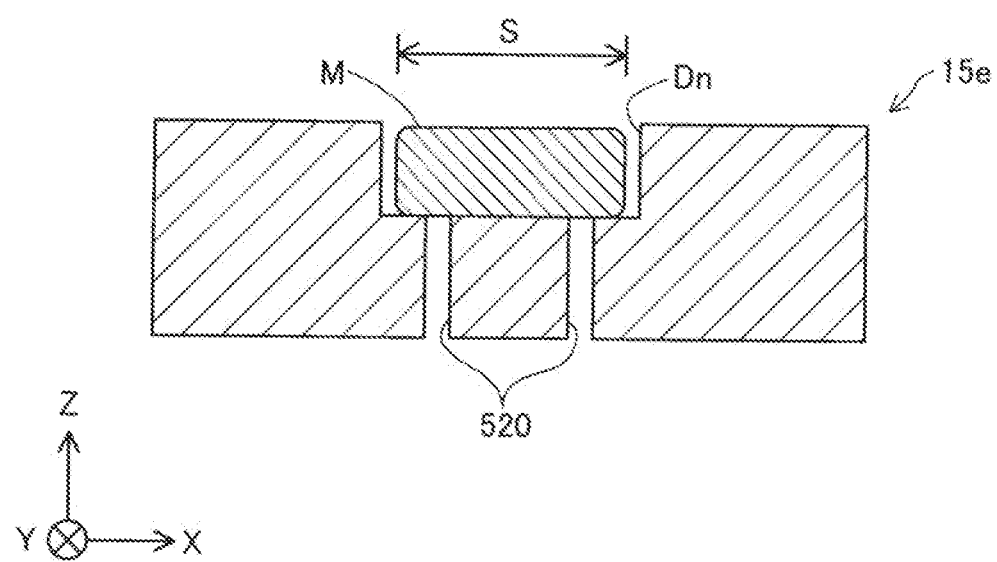
FIG. 19 is a first view diagrammatically showing a cross section of the lower die in the fifth embodiment.

FIG. 18 is a plan view showing a central portion, in the directions X and Y, of the lower die 15e in the fifth embodiment, and further showing portions around the central portion. FIG. 19 is a first view diagrammatically showing a cross section of the lower die 15e. FIG. 18 is a top view showing the central portion, in the directions X and Y, of the lower die 15e and the portions around the central portion. FIG. 19 diagrammatically shows an insert member M placed in an insert position S. The insert member M is, for example, a member made of metal or a member made of resin different from the molding material injected from the injection unit 110. In the following description, the state in which the insert member M is placed in the insert position S is called a correct placement state in some cases.

In the present embodiment, the insert position S is defined as a position in the opening of a recess Dn formed in the lower die 15e, as shown in FIGS. 18 and 19. The recess Dn is a portion that defines the cavity of the molding die 10. The recess Dn may, for example, be provided with a step that positions the insert member M in the insert position S.

Air holes 520 are formed at the insert position S. In the present embodiment, four air holes 520 are formed at the insert position S. The air holes 520 are formed at the insert position S so as to pass through the lower die 15e in the direction Z. The air holes 520 are formed in positions where the air holes 520 do not overlap with a through hole into which the ejector pin 262 is inserted when viewed from above, as shown in FIG. 18. The air holes 520 are closed by the insert member M placed in the insert position S, as shown in FIG. 19.

The insert detector 510 in the present embodiment includes a suction section 511, a measurement section 512, and a detection section 513, as shown in FIG. 17. The suction section 511 is a member configured to be capable of sucking air at the insert position S through the air holes 520 shown in FIGS. 18 and 19. In the present embodiment, the suction section 511 is formed of a suction pump and sucks air at the insert position S into the suction section 511 via the air holes 520 and tubes that are not shown but are coupled to the air holes 520. The measurement section 512 measures the flow rate or the pressure of the air sucked by the suction section 511. In the present embodiment, the measurement section 512 is formed of a flowmeter that measures the flow rate of the air. In other embodiments, the measurement section 512 may be formed, for example, of a pressure gauge that measures the pressure of the air. The detection section 513 detects whether or not the correct placement state has been achieved based on the air flow rate or pressure measured by the measurement section 512. In the present embodiment, the controller 500 functions as the detection section 513.

Figure 20:
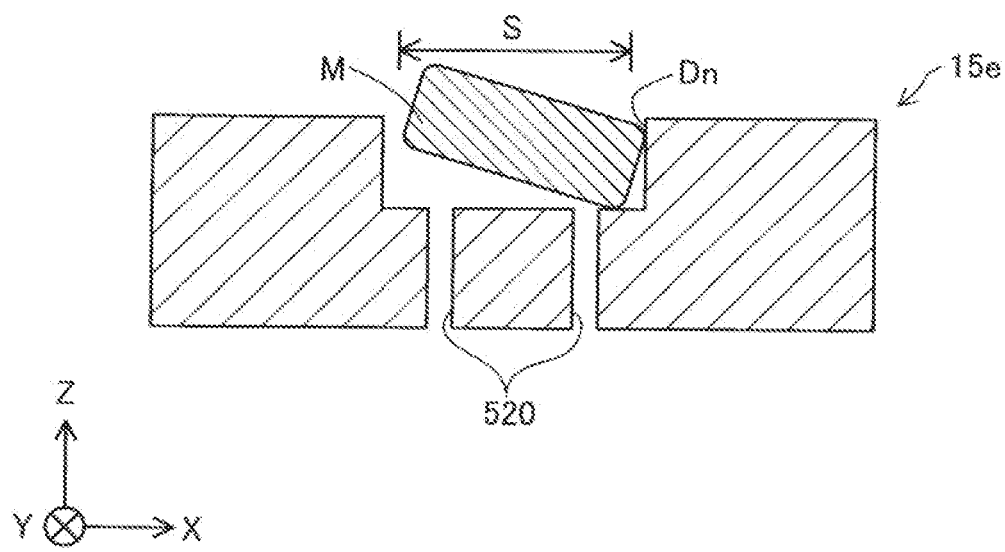
FIG. 20 is a second view diagrammatically showing the cross section of the lower die in the fifth embodiment.

FIG. 20 is a second view diagrammatically showing the cross section of the lower die 15e. FIG. 20 shows an example of the lower die 15e and insert member M in an "incorrect placement state," which is the state in which the insert member M is placed in the lower die 15e in a position different from the insert position S. In the state shown in FIG. 20, since the air holes 520 are not closed by the insert member M, the flow rate of the air sucked by the suction section 511 and measured by the measurement section 512 is greater than the flow rate in the correct placement state shown in FIG. 19. Also when the insert member M is not placed in the lower die 15e, or when only part of the air holes 520 is covered with the insert member M in the incorrect placement state, a large air flow rate is measured by the measurement section 512. The controller 500 that functions as the detection section 513 can therefore detect whether or not the correct placement state has been achieved based on the difference between the air flow rate measured by the measurement section 512 and the air flow rate in the correct placement state. The air flow rate in the correct placement state can be determined in advance, for example, by an experiment. Even when the measurement section 512 is formed of a pressure gauge that measures the pressure of the air, the detection section 513 can similarly detect whether or not the correct placement state has been achieved based on the difference between the measured pressure and the pressure in the correct placement state.

When detecting that the correct placement state has not been achieved, the controller 500 that functions as the detection section 513 may, for example, inform the user that the correct placement state has not been achieved via a notifier that is not shown. In this case, the notifier may, for example, be a display section formed of a liquid crystal panel or any other component that displays visual information, or a speaker or any other component that issues audio information. When the injection molding apparatus 100 includes, for example, a material supply robot as in the third and fourth embodiments, the controller 500 may control the material supply robot to perform the suction and the measurement of the air immediately after the placement of the insert member M in the lower die 15e, and when the controller 500 detects that the correct placement state has not been achieved, the controller 500 may control the material supply robot to adjust the position of the insert member M in such a way that the correct placement state is achieved. Therefore, the insert member M can be placed in the lower die 15e in the first standby position W1 or the second standby position W2, and the position of the insert member M can be adjusted. Therefore, the injection molding can be more efficiently performed as compared with a case where whether or not the incorrect placement state has occurred is detected or the position of the insert member M is adjusted in a position different from the first standby position W1 or the second standby position W2.

The injection molding apparatus 100e according to the present embodiment described above also allows reduction in the size of the entire injection molding apparatus 100e in the vertical direction as compared with the case where the injection unit 110 includes an in-line screw and produces the molding material by using the in-line screw. In the present embodiment, in particular, the injection molding apparatus 100e includes the insert detector 510, which detects whether or not the insert member M has been placed in the insert position S. According to the aspect described above, the insert detector 510 can be used to detect whether or not the insert member M has been placed in the insert position S. Therefore, for example, when insert molding is performed, the injection molding is not performed in a state in which the insert member M has not been placed in the insert position S, whereby a situation in which a defective molded product is manufactured can be avoided. Furthermore, the situation in which the injection molding is performed with the insert member M placed in a position different from the insert position S can be avoided, whereby damage to the molding die 10, the injection unit 110, and other components can be suppressed.

In the present embodiment, the insert detector 510 includes the suction section 511, which is configured to be capable of sucking air at the insert position S via the air holes 520 formed at the insert position S, the measurement section 512, which measures the flow rate or the pressure of the sucked air, and the detection section 513, which detects whether or not the insert member M has been placed in the insert position S based on the measured flow rate or pressure of the air. Therefore, with simple configuration, detection of whether or not the insert member M has been placed in the insert position S based on the flow rate or the pressure of the air can be performed.

Figure 22:
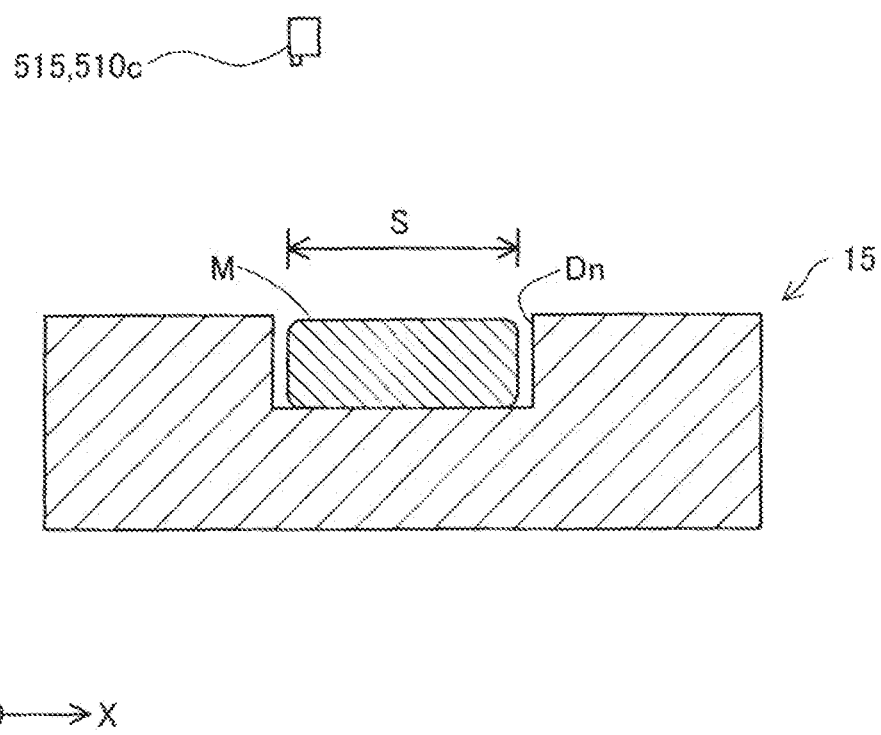
FIG. 22 is a diagrammatic view for describing the insert detector in another embodiment.
Figure 23:
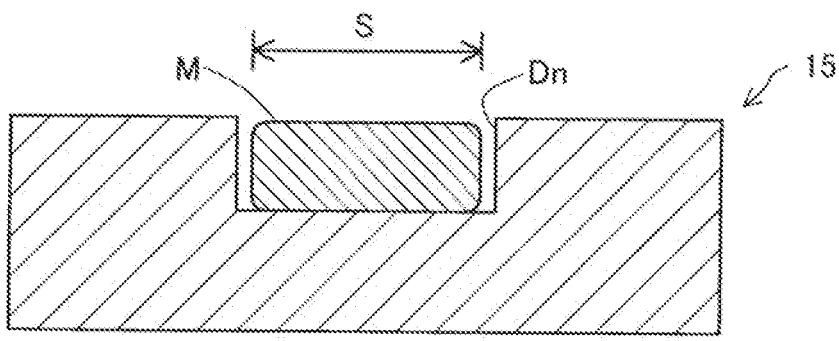
FIG. 23 is a diagrammatic view for describing the insert detector in another embodiment.
Figure 23:
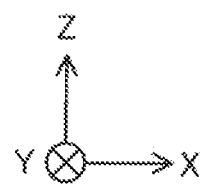
Figure 24:
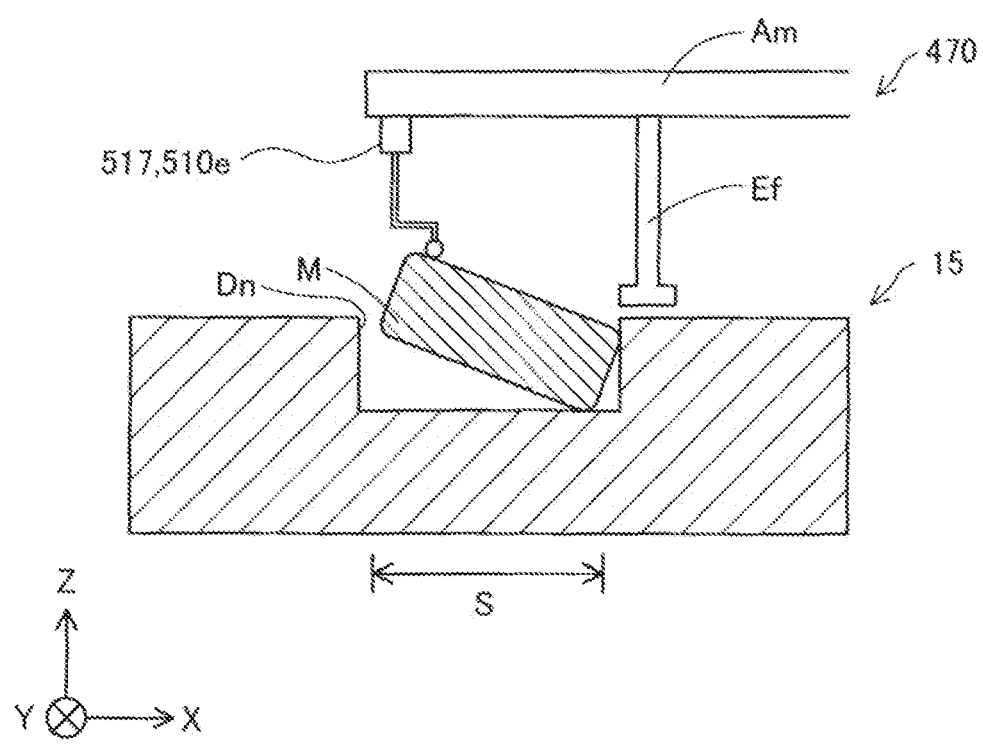
FIG. 24 is a diagrammatic view for describing the insert detector in another embodiment.

FIGS. 21 to 26 are diagrammatic views for describing insert detector 510b to 510g in other embodiments. FIGS. 21 to 23, 25, and 26 show that the insert member M is placed in the insert position S, as in FIG. 19. FIG. 24 shows an example of the insert member M in the incorrect placement state. The insert detectors 510b to 510g shown in FIGS. 21 to 26 do not each include the suction section 511, the measurement section 512, or the detection section 513, as in FIG. 20, unlike in the fifth embodiment. In the aspects shown in FIGS. 24 to 26, the injection molding apparatus 100 includes the first robot 470, which functions as the transport robot and the material supply robot, as in the fourth embodiment.

Figure 21:
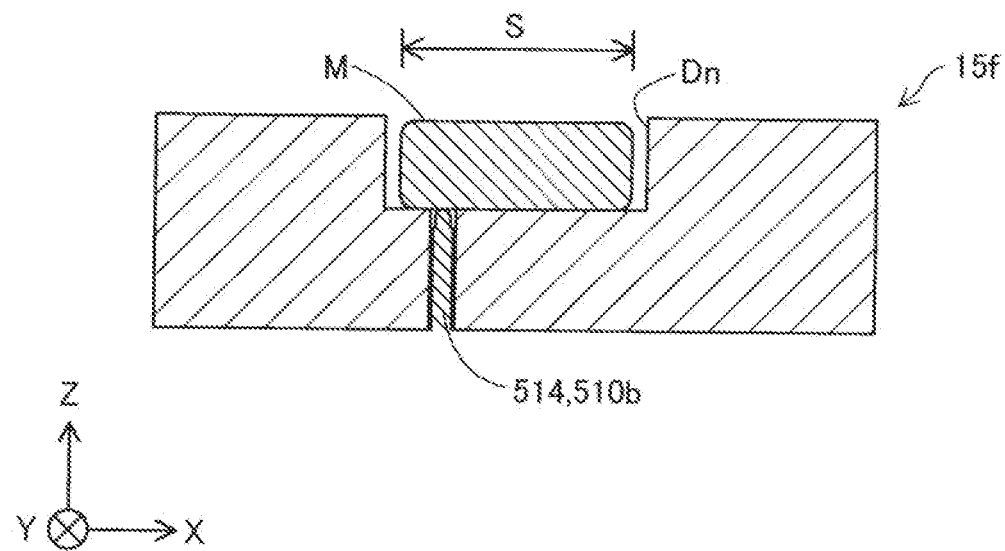
FIG. 21 is a diagrammatic view for describing an insert detector in another embodiment.

The insert detector 510b shown in FIG. 21 includes a contact-type displacement sensor 514 configured to be capable of detecting the amount by which the upper end thereof has been pushed. The contact-type displacement sensor 514 is inserted into a through hole formed at the insert position S so as to pass through the lower die 15e in the direction Z so that the upper end of the sensor 514 protrudes upward beyond the through hole. The upper end of the contact-type displacement sensor 514 is pushed downward by the insert member M placed in the insert position S, as shown in FIG. 21. The contact-type displacement sensor 514 detects the amount over which the pushing operation has been performed, which is the amount by which the upper end has been pushed, with the aid of a differential transformer. In the aspect shown in FIG. 21, the controller 500 detects that the correct placement state has been achieved when the amount over which the upper end of the contact-type displacement sensor 514 has been pushed falls within a predetermined range. The range of the amount over which the pushing operation has been performed is determined based, for example, on an experimentally measured amount over which the pushing operation has been performed in the correct placement state.

The insert detector 510c shown in FIG. 22 includes an optical sensor 515, which measures the distance, for example, to the lower die 15 based on triangulation. The optical sensor 515 includes a transmitter that transmits laser light and a light receiver that detects the laser light transmitted by the transmitter and reflected, for example, off the lower die 15. In the aspect shown in FIG. 22, the controller 500 controls the optical sensor 515 to measure the distance between the recess Dn formed in the lower die 15 and the optical sensor 515 by causing the light receiver to detect the laser light transmitted by the transmitter and reflected, for example, off the lower die 15. The controller 500 detects that the correct placement state has been achieved when the value of the measured distance falls within a predetermined range. The range of value of the distance is determined based on an experimentally measured distance between the insert member M and the optical sensor 515 in the correct placement state.

The insert detector 510d shown in FIG. 23 includes a camera 516, which captures images of the recess Dn of the lower die 15 and portions around the recess Dn. In the aspect shown in FIG. 23, the controller 500 detects whether or not the correct placement state has been achieved by analyzing the images captured by the camera 516.

The optical sensor 515 described with reference to FIG. 22 or the camera 516 described with reference to FIG. 23 is disposed, for example, in a position where the optical sensor 515 or the camera 516 faces the lower die 15 located in the standby position W. The optical sensor 515 or the camera 516 may be fixed, for example, to the enclosure 90, the base 400, or the injection unit 110. When the injection molding apparatus 100 is configured to be capable of switching the first state to the second state and vice versa, as in the second to fourth embodiments, it is more preferable that the optical sensor 515 or the camera 516 is disposed both in the position where the optical sensor 515 or the camera 516 faces the second lower die 17 located in the first standby position W1 and the position where the optical sensor 515 or the camera 516 faces the first lower die 16 located in the second standby position W2. The insert detector 510c or 510d can thus detect whether or not the insert member M has been placed in the insert position S both in the first standby position W1 and the second standby position W2.

The insert detector 510e shown in FIG. 24 is formed of a contact-type detection sensor 517, which detects contact with the lower die 15. The contact detection sensor 517 is fixed to an arm Am of the first robot 470. The contact detection sensor 517 is disposed in a position where the contact detection sensor 517 is not in contact with the insert member M in the correct placement state when the contact detection sensor 517 scans the position that coincides with the insert position S when viewed along the direction Z. In the aspect shown in FIG. 24, the controller 500 detects that the correct placement state has been achieved when no contact is detected by the contact detection sensor 517.

Figure 25:
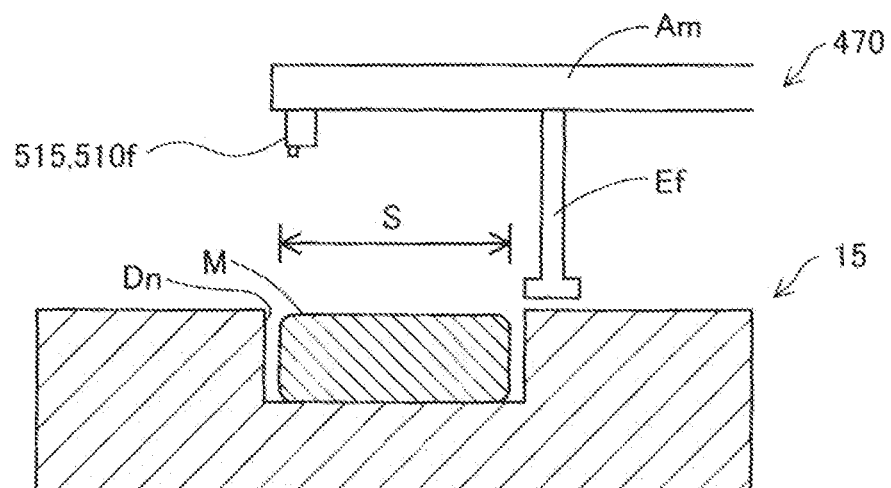
FIG. 25 is a diagrammatic view for describing the insert detector in another embodiment.

The insert detector 510f shown in FIG. 25 is formed of the optical sensor 515 described with reference to FIG. 22. In the aspect shown in FIG. 25, the optical sensor 515 is fixed to the arm Am of the first robot 470, as the contact detection sensor 517 described with reference to FIG. 24 is. In the aspect shown in FIG. 25, the controller 500 detects that the correct placement state has been achieved as in the aspect described with reference to FIG. 22.

Figure 26:
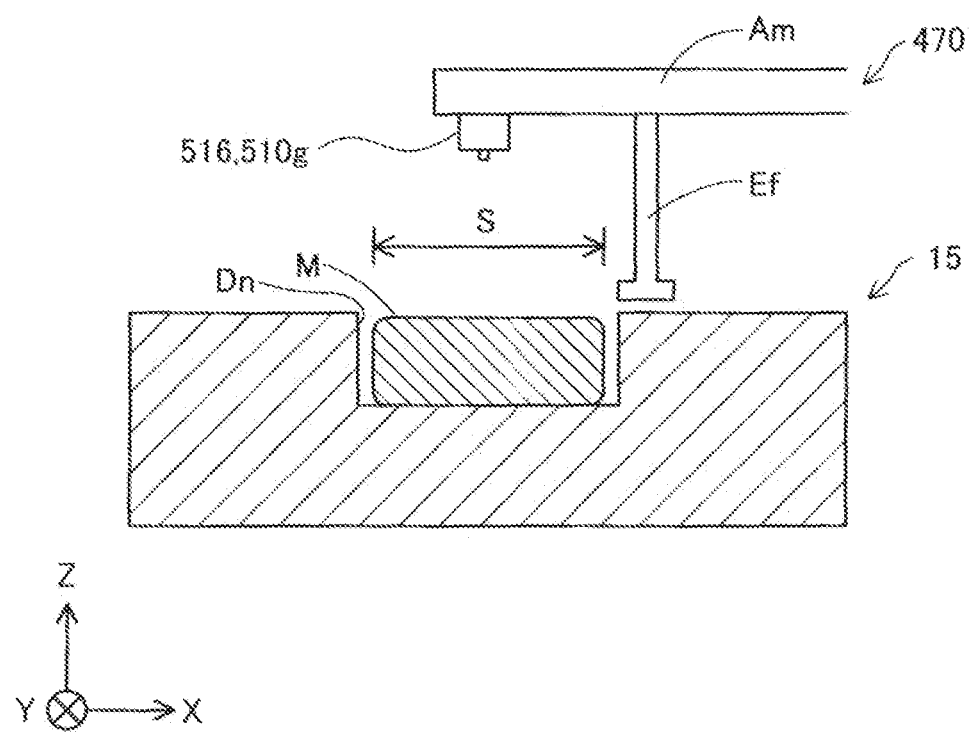
FIG. 26 is a diagrammatic view for describing the insert detector in another embodiment.

The insert detector 510g shown in FIG. 26 is formed of the camera 516 described with reference to FIG. 23. In the aspect shown in FIG. 26, the camera 516 is fixed to the arm Am of the first robot 470. In the aspect shown in FIG. 26, the controller 500 detects that the correct placement state has been achieved as in the aspect described with reference to FIG. 23.

As described above, in the aspects shown in FIGS. 24 to 26, the variety of sensors and other components that form the insert detectors are fixed to the arm Am of the first robot 470. In the aspects described above, the controller 500 controls the robot 450 to place the insert member M in the lower die 15 with the aid of the end effector Ef attached to the arm Am, and then detects whether or not the correct placement state has been achieved based, for example, on the result of the detection performed by any of the sensors or other components attached to the arm Am. When the controller 500 determines that the correct placement state has not been achieved, the position of the insert member M can be adjusted again by the end effector Ef. Insert molding can therefore be performed more efficiently with no defective molded product manufactured and damage to the molding die 10 and injection unit 110 suppressed. Even when the injection molding apparatus 100 is configured to be capable of switching the first state to the second state and vice versa as in the second to fourth embodiments, whether or not the insert member M has been placed in the insert position S can be detected in both the first standby position W1 and the second standby position W2 without installation of the plurality of sensors and other components that form the insert detectors.

Figure 27:
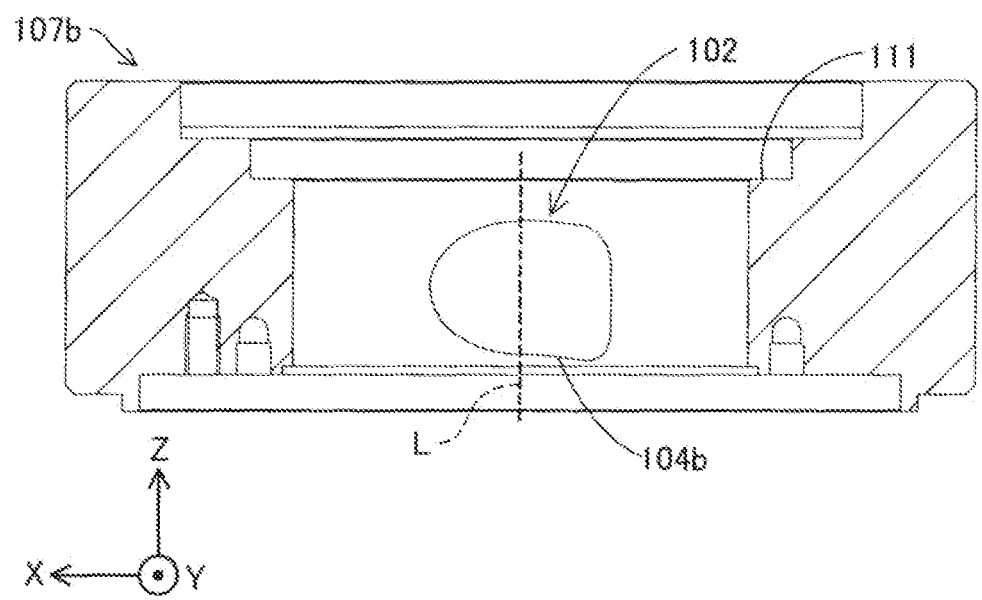
FIG. 27 shows a cross section of a case in another embodiment.

F. Other Embodiments (F-1) In the embodiments described above, the exit port 104 of the introduction path 102 has a rectangular shape when viewed along the direction Y. In contrast, the exit port 104 may not have a rectangular shape when viewed along the direction Y. FIG. 27 shows a cross section of a case 107b in another embodiment. An exit port 104b shown in FIG. 27 has an asymmetrical shape in the direction X when viewed along the direction Y, unlike the exit port 104 described with reference to FIG. 9. In more detail, when viewed along the direction Y, a portion of the exit port 104b, the portion shifted in the direction −X from a bisector line L, which bisects the exit port 104b in the direction X, has a semi-elliptical shape, and the portion shifted in the direction +X from the bisector line L has a rectangular shape. On the other hand, the exit port 104b has a shape elongated as a whole in the direction X when viewed along the direction Y, as the exit port 104 described with reference to FIG. 9 does. Even the aspect described above suppresses clogging of the material in the introduction path 102. Still instead, the exit port 104 may have a circular shape, an elliptical shape, or any other shape when viewed along the direction Y.

(F-2) In the embodiments described above, the die clamper 200 performs the die clamping and the die opening by moving the injection unit 110 and the upper die 11 along the vertical direction. In contrast, the die clamper 200 may perform the die clamping and the die opening by moving the lower die 15 along the vertical direction.

(F-3) In the embodiments described above, the die clamping motor 212 is disposed below the lower die 15. In contrast, the die clamping motor 212 may be disposed in a position flush with the lower die 15 in the vertical direction, or may be disposed above the lower die 15.

(F-4) In the embodiments described above, the die clamping motor 212 functions as the descent restrictor. In contrast, the die clamping motor 212 may not function as the descent restrictor. For example, the descent restrictor may be formed, for example, of a stopper or a clamp that supports the injection unit 110 with the molding die 10 opened, or may be formed, for example, of a hook that lifts and fixes the injection unit 110. The injection molding apparatus 100 may include no descent restrictor.

(F-5) In the embodiments described above, in the die clamping, the controller 500 controls the die clamping motor 212 in such a way that the value of the torque produced thereby becomes the first torque value and presses the upper die 11 against the lower die 15, then lowers the value of the torque produced by the die clamping motor 212 from the first torque value to the second torque value and presses the upper die 11 against the lower die 15, and further raises the value of the torque produced by the die clamping motor 212 from the second torque value to the third torque value and presses the upper die 11 against the lower die 15. In contrast, the controller 500 may not control the value of the torque produced by the die clamping motor 212 as described above in the die clamping. For example, the controller 500 may lower the torque value from the first torque value to the second torque value, then maintain the torque value at the second torque value, and then perform the die opening without raising the torque value.

(F-6) In the embodiments described above, the controller 500 increases the maximum value of the torque produced by the die clamping motor 212 in the die clamping to a value greater than the maximum value of the torque produced by the die clamping motor 212 in the die opening. In contrast, the controller 500 may set the maximum torque value in the die clamping at a value smaller than the maximum torque value in the die opening, or set the maximum torque value in the die opening to be equal to the maximum torque value in the die clamping.

(F-7) In the embodiments described above, the position changer 180 linearly moves the lower die support 150 along the direction X. In contrast, the position changer 180 may not linearly move the lower die support 150. For example, the position changer 180 may be formed of what is called a rotary table that moves the lower die support 150 so as to draw a circular trajectory when viewed along the vertical direction.

(F-8) In the embodiments described above, the first support 156 and the second support 157 are configured as part of the pair of blocks 152b, which form the lower die support 150b. In contrast, the first support 156 or the second support 157 may not be configured as part of the blocks 152b. For example, the first support 156 and the second support 157 may be configured as separate holders that hold the first lower die 16 and the second lower die 17, respectively. In this case, the position changer 180 may, for example, be configured to be capable of separately moving the first support 156 and the second support 157, and may switch the first state to the second state and vice versa by separately moving the first support 156 and the second support 157.

(F-9) In the embodiments described above, the first positioner 190 and the second positioner 193 function as the injection positioner. In contrast, the first positioner 190 or the second positioner 193 may not function as the injection positioner. For example, the injection molding apparatus 100 may include a first positioner 190 and a second positioner 193 that do not position the lower die at the injection position, and an injection positioner. Still instead, the injection molding apparatus 100 may include neither the first positioner 190, the second positioner 193, nor the injection positioner, or may include, for example, only one of the positioners described above.

G. Other Aspects

The present disclosure is not limited to the embodiments described above and can be achieved in a variety of aspects to the extent that the aspects do not depart from the substance of the present disclosure. For example, the present disclosure can be achieved by the aspects below. The technical features in the embodiments described above that correspond to the technical features in the aspects described below can be replaced or combined with each other as appropriate to solve part or entirety of the problems of the present disclosure or achieve part or entirety of the effects of the present disclosure. Furthermore, when any of the technical features has not been described as an essential feature in the present specification, the technical feature can be deleted as appropriate.

(1) According to an aspect of the present disclosure, an injection molding apparatus is provided. The injection molding apparatus includes a support that supports a molding die including an upper die and a lower die, and an injection unit that injects a molding material toward a cavity defined by the upper die and the lower die. In the state in which the molding die is supported by the support, the injection unit, the upper die, and the lower die are arranged sequentially from above in the vertical direction. The injection unit includes a rotating flat screw having a groove forming surface in which a groove is formed, a barrel having a flat screw facing surface facing the groove forming surface and having a communication hole into which the molding material flows, and a heater that heats a material supplied to the space between the groove forming surface and the flat screw facing surface, plasticizes at least part of the material through the rotation of the flat screw and the heat produced by the heater to produce the molding material, and delivers the molding material to the communication hole.

According to the aspect described above, the size of the entire injection molding apparatus can be reduced in the vertical direction as compared with the case where the injection unit includes an in-line screw and produces the molding material by using the in-line screw.

(2) In the aspect described above, the injection molding apparatus may include a die clamper that performs die clamping and die opening operation of clamping and opening the upper die and the lower die by moving the injection unit and the upper die along the vertical direction with the molding die supported by the support. According to the aspect described above, the injection unit and the upper die can be moved in the vertical direction relative to the lower die to perform the die clamping and the die opening without movement of the lower die in the vertical direction. The molded product can thus be removed from the lower die at a fixed position in the vertical direction, whereby the step of removing the molded product, for example, can be more readily automated. Furthermore, when insert molding is performed, the insert member can be placed in the lower die at a fixed position in the vertical direction, whereby, for example, the step of placing the insert member in the insert molding can be more readily automated.

(3) In the aspect described above, the injection molding apparatus may include a descent restrictor configured to be capable of restricting the movement of the injection unit and the upper die in the direction toward the lower die. According to the aspect described above, the descent restrictor can suppress unintentional movement of the injection unit and the upper die toward the lower die.

(4) In the aspect described above, the die clamper may include a die clamping motor disposed below the lower die, the die clamping motor may be driven to move the injection unit and the upper die along the vertical direction, and the injection molding apparatus may further include a controller that controls the driving of the die clamping motor. According to the aspect described above, the injection unit and the upper die can be moved along the vertical direction by controlling the die clamping motor, and the arrangement of the members that form the injection unit is unlikely to be restricted by the arrangement of the die clamping motor as compared with an aspect in which the die clamping motor is disposed above the lower die. The degree of freedom of the configuration of the injection unit can therefore be increased.

(5) In the aspect described above, in the injection step of injecting the molding material from the injection unit toward the cavity, the controller may control the die clamping motor in such a way that the value of the torque produced thereby becomes a first torque value and press the upper die against the lower die, then lower the torque value from the first torque value to a second torque value and press the upper die against the lower die, and further raise the torque value from the second torque value to a third torque value and press the upper die against the lower die. According to the aspect described above, an overload on the die clamping motor can be suppressed, and leakage of the molding material from the molding die can be suppressed.

(6) In the aspect described above, the controller may increase the maximum value of the torque produced by the die clamping motor in the die clamping to a value greater than the maximum value of the torque produced by the die clamping motor in the die opening. According to the aspect described above, the load exerted on the die clamping motor can be reduced in the die opening.

(7) In the aspect described above, the injection molding apparatus may include a first support that supports a first lower die as the lower die, a second support that supports a second lower die as the lower die, and a position changer configured to be capable of moving the first support and the second support, and the position changer may move the first lower die or the second lower die to an injection position where the lower die and the upper die face each other by moving the first support and the second support, and switch a first state to a second state and vice versa, the first state being a state in which the first lower die is located in the injection position and the second lower die is located in a position different from the injection position, the second state being a state in which the second lower die is located in the injection position and the first lower die is located in a position different from the injection position. According to the aspect described above, while the molded product is molded by using one of the lower dies that is located in the injection position, the molded product can be removed from the other lower die located in the position different from the injection position. The first lower die and the second lower die can therefore be used to efficiently mold the molded products. When insert molding is performed, while the insert molding is performed by using one of the lower dies that is located in the injection position, the insert member can be placed in the other lower die located in the position different from the injection position. The first lower die and the second lower die can therefore be used to efficiently perform the insert molding.

(8) In the aspect described above, the injection molding apparatus may include an injection positioner that positions the first lower die or the second lower die in the injection position. According to the aspect described above, the injection positioner can position the first lower die, which moves as the first support moves, or the second lower die, which moves as the second support moves, in the injection position, whereby the injection molding can be efficiently performed.

(9) In the aspect described above, the position changer may linearly move the first support and the second support along an intersecting direction that intersects with the vertical direction to position the second lower die in a first standby position different from the injection position in the first state and position the first lower die in a second standby position on a side opposite from the first standby position with the injection position sandwiched therebetween in the intersecting direction in the second state. According to the aspect described above, the position changer can readily switch the first state to the second state and vice versa by linearly moving the first and second supports along the intersecting direction.

(10) In the aspect described above, the injection molding apparatus may include a first positioner that positions the second lower die in the first standby position, and a second positioner that positions the first lower die in the second standby position. According to the aspect described above, when one of the first lower die and the second lower die is located in the injection position, the other is positioned in the corresponding standby position. Therefore, for example, the removal of the molded product from the first lower die or the second lower die and the placement of the insert member in the first lower die or the second lower die can be performed more efficiently in the corresponding standby position. Furthermore, the step of removing the molded product and the step of placing the insert member can be more readily automated.

(11) In the aspect described above, the injection molding apparatus may include a first ejector that removes the molded product from the second lower die in the first standby position, and a second ejector that removes the molded product from the first lower die in the second standby position. According to the aspect described above, regardless of the first state or the second state, the molded product can be readily removed from the first lower die or the second lower die by using the first ejector or the second ejector.

(12) In the aspect described above, the injection molding apparatus may include a transport robot that transports the molded product removed from the first lower die in the second standby position and the molded product removed from the second lower die in the first standby position. According to the aspect described above, the step of transporting the molded product removed from each of the first lower die and the second lower die to the next step can be automated, whereby the molded product can be molded more efficiently.

(13) In the aspect described above, the injection molding apparatus may include a material supply robot that places the insert member in the first lower die located in the second standby position and in the second lower die located in the first standby position. According to the aspect described above, the step of placing the insert member in the first lower die and the second lower die can be automated, whereby the insert molding can be performed more efficiently.

(14) In the aspect described above, the injection molding apparatus may include an insert detector that detects whether or not the insert member has been placed in an insert position specified in advance in the lower die. According to the aspect described above, the insert detector can detect whether or not the insert member M has been placed in the insert position S. Therefore, for example, when insert molding is performed, the injection molding is not performed in the state in which the insert member has not been placed in the insert position, whereby the situation in which a defective molded product is manufactured can be avoided. Furthermore, the situation in which the injection molding is performed with the insert member placed in a position different from the insert position can be avoided, whereby damage to the molding die, the injection unit, and other components can be suppressed.

(15) In the aspect described above, an air hole closed by the insert member placed in the insert position may be formed at the insert position, and the insert detector may include a suction section configured to be capable of sucking air at the insert position via the air hole, a measurement section that measures the flow rate or the pressure of the air sucked by the suction section, and a detection section that detects whether or not the insert member has been placed in the insert position based on the air flow rate or pressure measured by the measurement section. According to the aspect described above, the simple configuration allows detection of whether or not the insert member has been placed in the insert position based on the flow rate or the pressure of the air.

The present disclosure can be realized in a variety of aspects in addition to the aspects as the injection molding apparatus described above. For example, the present disclosure can be realized, for example, in the form of an injection molding system.

What is claimed is:
1. An injection molding apparatus comprising:
   a support that supports a molding die including an upper die and a lower die;
   an injection head configured to inject a molding material toward a cavity defined by the upper die and the lower die, the injection head including:
      a flat screw having a groove forming surface in which a groove is formed;
      a barrel having a flat screw facing surface facing the groove forming surface and having a communication hole into which the molding material flows; and
      a heater configured to heat a source material supplied to a space between the groove forming surface and the flat screw facing surface;
   a die clamping motor configured to drive a die clamper to move the upper die and the lower die along a vertical direction to clamp and release the upper and lower dies relative to each other;
   a memory configured to store a program; and
   a processor configured to execute the program so as to:
      control the injection head to plasticize at least part of the source material due to rotation of the flat screw and heat from the heater to produce the molding material and deliver the molding material into the communication hole;
      control the die clamping motor so that a value of torque produced thereby becomes a first torque value and press the upper die against the lower die, thereafter lower the value of torque from the first torque value to a second torque value and press the upper die against the lower die, and further raise the value of torque from the second torque value to a third torque value and press the upper die against the lower die; and cause the injection head to inject the molding material into the cavity via the communication hole after the upper die is pressed against the lower die with the third torque value,
wherein the injection head, the upper die, and the lower die are arranged sequentially from above in the vertical direction in a state in which the molding die is supported by the support.

2. The injection molding apparatus according to claim 1, wherein the die clamping motor is configured to move the injection head and the upper die along the vertical direction with the molding die supported by the support.

3. The injection molding apparatus according to claim 2, further comprising a descent restrictor configured to restrict movement of the injection head and the upper die in a direction toward the lower die.

4. The injection molding apparatus according to claim 2, wherein the die clamping motor is disposed below the lower die, and the die clamping motor is configured to move the injection head and the upper die along the vertical direction.

5. The injection molding apparatus according to claim 4, wherein the processor is configured to increase a maximum value of torque produced by the die clamping motor to a value greater than the maximum value of the torque produced by the die clamping motor when the processor controls the die clamping motor to release the upper and lower dies.

6. The injection molding apparatus according to claim 2, further comprising
a first support that supports a first lower die as the lower die;
a second support that supports a second lower die as the lower die; and
a position changer configured to:
move the first support and the second support;
move the first lower die or the second lower die to an injection position where the lower die and the upper die face each other by moving the first support and the second support; and
switch a first state to a second state and vice versa, the first state being a state in which the first lower die is located in the injection position and the second lower die is located in a position different from the injection position, the second state being a state in which the second lower die is located in the injection position and the first lower die is located in a position different from the injection position.

7. The injection molding apparatus according to claim 6, further comprising an injection positioner that positions the first lower die or the second lower die in the injection position.

8. The injection molding apparatus according to claim 6, wherein the position changer linearly moves the first support and the second support along an intersecting direction that intersects with the vertical direction to position the second lower die in a first standby position different from the injection position in the first state and position the first lower die in a second standby position on a side opposite from the first standby position with the injection position sandwiched therebetween in the intersecting direction in the second state.

9. The injection molding apparatus according to claim 8, further comprising a first positioner that positions the second lower die in the first standby position, and a second positioner that positions the first lower die in the second standby position.

10. The injection molding apparatus according to claim 8, further comprising a first ejector that removes a molded product from the second lower die in the first standby position, and a second ejector that removes a molded product from the first lower die in the second standby position.

11. The injection molding apparatus according to claim 10, further comprising a transport robot that transports the molded product removed from the first lower die in the second standby position and the molded product removed from the second lower die in the first standby position.

12. The injection molding apparatus according to claim 8, further comprising a material supply robot that places an insert member in the first lower die located in the second standby position and in the second lower die located in the first standby position.

13. The injection molding apparatus according to claim 1, further comprising an insert detector that detects whether or not an insert member is placed in an insert position specified in advance in the lower die.

14. The injection molding apparatus according to claim 13, wherein an air hole closed by the insert member placed in the insert position is formed at the insert position, and the insert detector includes:
a suction section configured to suck air at the insert position via the air hole;
a measurement section that measures a flow rate or a pressure of the air sucked by the suction section; and
a detection section that detects whether or not the insert member is placed in the insert position based on the air flow rate or pressure measured by the measurement section.

* * * * *